(12) United States Patent
Syed et al.

(10) Patent No.: US 10,555,303 B2
(45) Date of Patent: *Feb. 4, 2020

(54) METHODS AND APPARATUS FOR ESTIMATING CITIZENS BROADBAND RADIO SERVICE NETWORK COVERAGE

(71) Applicant: Charter Communications Operating, LLC, St. Louis, MO (US)

(72) Inventors: Haider Syed, Parker, CO (US); Muhib T. Oduwaiye, Aurora, CO (US); Volkan Sevindik, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/447,546

(22) Filed: Jun. 20, 2019

(65) Prior Publication Data
US 2019/0394771 A1 Dec. 26, 2019

Related U.S. Application Data

(63) Continuation of application No. 16/016,579, filed on Jun. 23, 2018, now Pat. No. 10,368,351.

(51) Int. Cl.
*H04W 24/08* (2009.01)
*H04W 72/04* (2009.01)
(Continued)

(52) U.S. Cl.
CPC ..... *H04W 72/0446* (2013.01); *H04W 52/365* (2013.01); *H04W 72/048* (2013.01); *H04W 72/082* (2013.01); *H04W 72/0473* (2013.01)

(58) Field of Classification Search
CPC .......... H04W 52/365; H04W 72/0446; H04W 72/0473; H04W 72/048; H04W 72/082
(Continued)

(56) References Cited

U.S. PATENT DOCUMENTS 7,680,500 B2 3/2010 Tiedemann, Jr. et al.
9,525,536 B1 12/2016 Prock et al.
(Continued)

FOREIGN PATENT DOCUMENTS

WO 2013070029 A1 5/2013

OTHER PUBLICATIONS

Notification of Transmittal of the International Search Report and the Written Opinion of the International Searching Authority, International Search Report and Written Opinion of the International Searching Authority from PCT/US2019/038621 dated Sep. 13, 2019, 9 pages.

*Primary Examiner* — Tan H Trinh
(74) *Attorney, Agent, or Firm* — Straub & Straub; Stephen T. Straub; Michael P. Straub

(57) ABSTRACT

Methods and apparatus for estimating a Citizens Broadband Radio Service Device's (CBSD's) coverage area using user equipment (UE) timing advance and/or power headroom information and allocating resources based on the estimate. In an exemplary method embodiment a Spectrum Access System: (i) receives, from a CBSD, user equipment (UE) information including at least one of timing advance or power headroom information for one or more UEs in communication with the CBSD; (ii) estimates, based on the received first UE information, a first CBSD coverage area; and (iii) makes a first resource allocation to the CBSD based on the estimated CBSD coverage area, the first resource allocation including an allocation of at least one of a frequency bandwidth allocation or transmission power allocation to the CBSD.

20 Claims, 18 Drawing Sheets

(51) Int. Cl.
*H04W 52/36* (2009.01)
*H04W 72/08* (2009.01)

(58) Field of Classification Search
USPC .......... 455/69, 522, 452.1, 452.2, 13.4, 512,
455/509; 370/315, 330, 331, 337
See application file for complete search history.

(56) References Cited

U.S. PATENT DOCUMENTS

| | | |
|---|---|---|
| 9,615,338 B2 | 4/2017 | Kim et al. |
| 10,368,351 B1* | 7/2019 | Syed .................... H04W 52/365 |
| 2013/0051331 A1 | 2/2013 | Bao et al. |
| 2014/0056278 A1* | 2/2014 | Marinier ............. H04W 72/044 370/330 |
| 2016/0226634 A1* | 8/2016 | Axmon ................... H04L 5/001 |
| 2016/0270094 A1 | 9/2016 | Dinan |
| 2017/0070982 A1 | 3/2017 | Kawasaki |
| 2017/0188241 A1* | 6/2017 | Mueck ................. H04W 16/14 |
| 2017/0208454 A1* | 7/2017 | Knisely ................ H04L 5/0058 |
| 2018/0014304 A1* | 1/2018 | Khoshnevisan ...... H04W 24/08 |
| 2018/0063844 A1* | 3/2018 | Khoshnevisan .. H04W 72/0453 |
| 2018/0132112 A1* | 5/2018 | Khoshnevisan ...... H04W 16/14 |
| 2018/0279316 A1* | 9/2018 | Mueck ................. H04B 17/345 |
| 2019/0007889 A1* | 1/2019 | Jayawickrama ...... H04W 16/14 |
| 2019/0028182 A1* | 1/2019 | Smyth ................... H04W 16/14 |
| 2019/0044614 A1* | 2/2019 | Khoshnevisan ..... H04B 7/2646 |
| 2019/0260566 A1* | 8/2019 | Fehrenbach .......... H04L 5/1469 |

\* cited by examiner

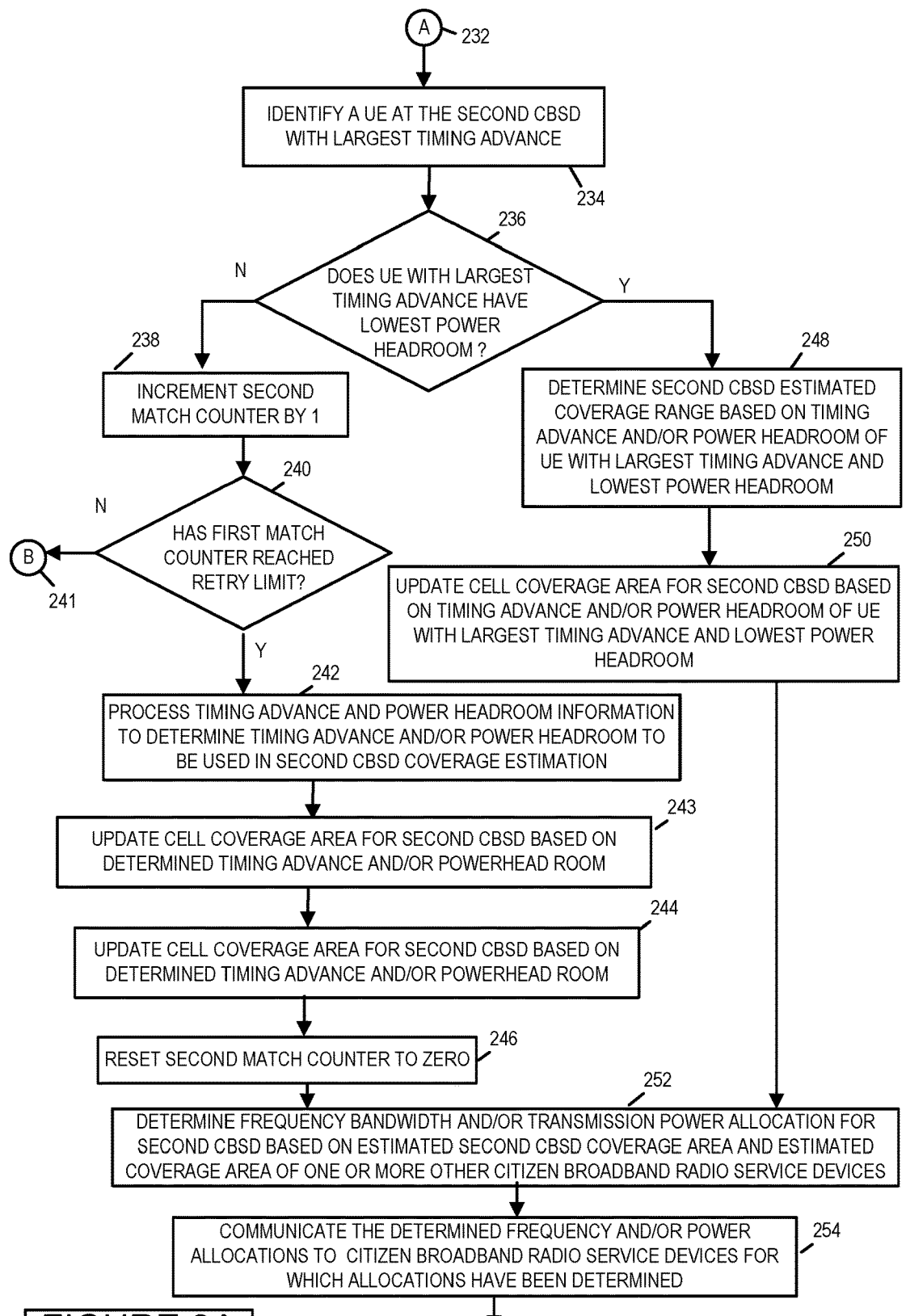

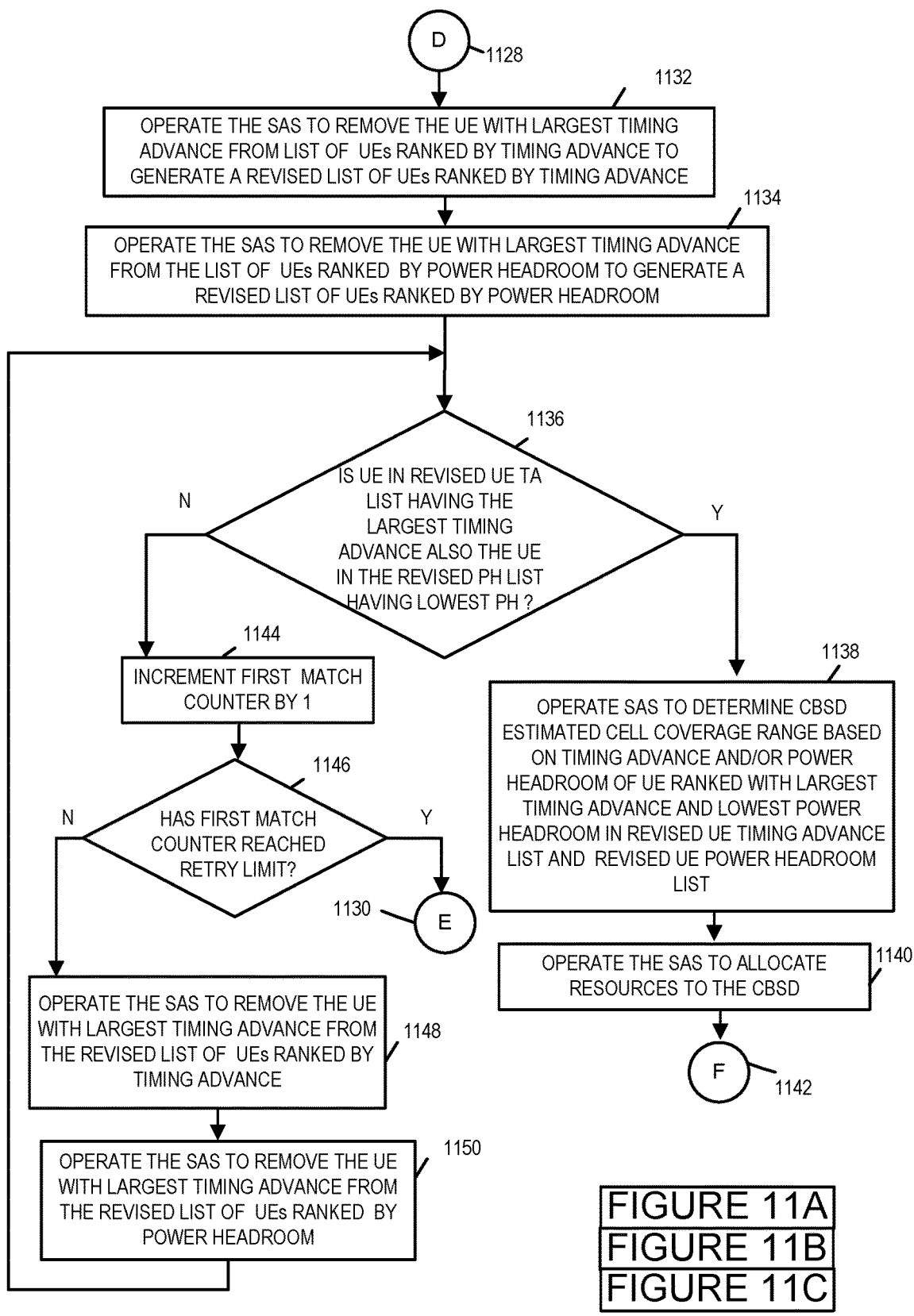

US 10,555,303 B2

METHODS AND APPARATUS FOR ESTIMATING CITIZENS BROADBAND RADIO SERVICE NETWORK COVERAGE

RELATED APPLICATIONS

The present application is a continuation of U.S. patent application Ser. No. 16/016,579 filed on Jun. 23, 2019 which is hereby expressly incorporated by reference in its entirety.

FIELD OF INVENTION

The present invention relates to methods and apparatus for estimating Citizens Broadband Radio Service (CBRS) network coverage. More particularly, the present invention relates to methods and apparatus for estimating a Citizens Broadband Radio Service Device's CBRS network coverage using Power Headroom and Timing Advance information. The present invention further relates to methods and apparatus for allocating resources based on one or more estimates of a Citizens Broadband Radio Service Device's CBRS network coverage using Power Headroom and Timing Advance information.

BACKGROUND OF THE INVENTION

In a Citizens Broadband Radio Service (CBRS) network, Citizens Broadband Radio Service Devices (CBSDs) serve as access points which can support wireless communications with user equipment devices (UEs).

A CBRS network often includes one or more Citizens Broadband Radio Service Devices (CBSDs) with relatively small coverage areas as compared to a macro base station or access point. The CBSDs are used to provide services to subscribers' user equipment devices. Spectrum is granted to each of the CBSDs using a centralized system called the Spectrum Access System (SAS), The Spectrum Access System is a central processing and database system that receives and processes spectrum grant requests. In the CBRS network, interference is managed through power management of CBSD devices by the Spectrum Access System (SAS). The SAS stores information regarding which CBSD uses how much spectrum at which location in the CBRS network. When a specific amount of spectrum is granted to a particular CBSD with a specific transmission power, the SAS calculates the coverage of this CBSD by using a pre-determined path-loss model. Each SAS provider is free to use a path-loss model that fits itself the best, therefore there is at least 7-10 dB in calculated coverage using different path-loss models. There is currently a technological problem in how to accurately estimate a CBSD's coverage and thereby efficiently allocate resources, e.g., frequency bandwidth allocations and/or power transmission allocations, that efficiently and effectively utilize the limited frequency spectrum available to the CBRS network. One of the important objectives of the FCC is to utilize the available frequency spectrum in the CBRS network as efficiently and effectively as possible.

From the above it should be understood that there is a need for new and/or improved methods and apparatus for more accurately estimating a Citizens Broadband Radio Service Device's coverage area and reducing the differences in CBSD coverage estimations by the CBRS Spectrum Access System. Additionally, there is a need for new and/or improved methods and apparatus for efficiently managing CBSD power transmission levels to reduce electromagnetic interference while optimizing CBSD devices coverage area using more accurate estimates for a CBSD's coverage area.

SUMMARY OF THE INVENTION

The present invention relates to methods, apparatus and systems for accurately estimating one or more CBSD's coverage area in a CBRS network and allocating resources, e.g., frequency bandwidth and power transmission levels, in accordance with those estimates. Various embodiments of the present invention solve one or more of the problems discussed above.

Timing advance is a parameter used to control the time at which a wireless terminal transmits so that signals transmitted by different terminals are received in a synchronized manner in one or more time slots used by a base station for example CBSD device in a CBRS network. The timing advance normally corresponds to a distance from the base station to which signals are being transmitted. For example, the timing advance of wireless terminals further from a base station can be controlled so that the more distant wireless terminals transmit sooner than the closer wireless terminals. In such a case the signals from the terminals far from the base station and near the base station will arrive at approximately the same time thus limiting interference to the base station which might otherwise occur if the signals from different wireless terminals were received in a non-synchronized manner.

Power headroom is a term used to describe information about how much, if any, transmission power increase is possible at a wireless terminal. The power headroom for terminals closer to a base station, e.g., CBSD device in a CBRS network, is normally greater than wireless terminals further from a base station since it is normally possible for a nearby terminal to communicate successfully with a base station using a lower transmission power than the wireless terminal's maximum transmission power. In some systems, wireless terminals report power headroom information to the base station with which it is communicating.

Various embodiments of the present invention utilize user equipment device timing advance and power headroom information corresponding to user equipment devices in communication with a CBSD to estimate the CBSD's coverage area and make and implement the allocation of resources based on the estimated CBSD's coverage area.

By using one or more of the techniques described herein a Citizens Broadband Radio Service Device coverage range can be more accurately estimated than previous known methods allowing for more efficient management and usage of the Citizens Broadband Radio Service (CBRS) network's spectrum an important objective of the United States Federal Communications Commission (FCC). More efficient management and usage of the CBRS network spectrum including more efficient allocations of resources, e.g., frequency bandwidth allocations and/or power transmission allocations, based on the more accurate estimates of one or more CBSDs coverage area results in, among other things, improved user equipment device network coverage while also minimizing electromagnetic interference in the CBRS network.

An exemplary method embodiment of present invention includes operating a Spectrum Access System (SAS) to receive, from a first Citizens Broadband Radio Service Device (CBSD), first user equipment (UE) information including at least one of timing advance or power headroom information for one or more UEs using and/or in communication with, said first CBSD; estimating, based on the received first UE information, a first CBSD coverage area; and making a first resource allocation to the first CBSD based on the estimated first CBSD coverage area, said first resource allocation including an allocation of at least one of a frequency bandwidth allocation or transmission power allocation to the first CBSD. In some embodiments, the method further includes the step of communicating the resource allocation to the first CBSD.

In some embodiments of the present invention, prior to the method step of estimating the first CBSD coverage area, the SAS is operated to identify at the first CBSD the UE with the largest timing advance. The method may and typically does further include the step of determining if the UE at the first CBSD having the largest timing advance also has the lowest power headroom of the UEs for which power headroom information is provided in said first UE information.

In some method embodiments of the present invention the step of estimating, based on the received first UE information, the first CBSD coverage area includes, when the first CBSD having the largest timing advance also has the lowest power headroom of the UEs for which power headroom information is provided, using the timing advance of the UE with the largest timing advance to estimate the first CBSD coverage area.

In some method embodiments of the present invention, the step of estimating, based on the received first UE information, the first CBSD coverage area includes, when the first CBSD having the largest timing advance also has the lowest power headroom of the UEs for which power headroom information is provided, taking into consideration the lowest power headroom information, in addition to the largest timing advance, when determining the first CBSD coverage area (e.g., if there is remaining power headroom that can be taken into consideration to determine that the coverage area of the first CBSD is larger than what would be indicated by simply the largest timing advance was used).

In some embodiments, the SAS in response to determining the UE in communication with first CBSD having the largest timing advance does not also have the lowest power headroom, processes the UE information received from the first CBSD corresponding to multiple UEs to determine at least one of a timing advance or power headroom value to be used in determining the coverage area of the first CBSD. The processing of the UE information received from the first CBSD corresponding to multiple UEs to determine at least one of a timing advance or power headroom value to be used in determining the coverage area of the first CBSD, may and in some embodiments does, include performing at least one of determining an average timing advance (TA) for UEs using or in communication with the first CBSD or determining an average power headroom for UEs using or in communication with the first CBSD. The TAs of UEs using and/or in communication with the first CBSD having a TA within a determined range of the average TA may be, and in some embodiments are, used in determining the coverage area of the first CBSD (e.g., based on the standard deviation of the TA values of UEs using or in communication with the first CBSD).

Some embodiments of the present invention further include the steps of: receiving, from a second CBSD, second user equipment (UE) information including at least one of timing advance or power headroom information for one or more UEs using or in communication with said second CBSD; estimating, based on the received second UE information, a second CBSD coverage area; and making a second resource allocation to the second CBSD based on the estimated first CBSD coverage area and the estimated second CBSD coverage area, said second resource allocation including an allocation of at least one of a frequency allocation or power allocation to the first CBSD.

The present invention is applicable to apparatus and system embodiments wherein one or more devices implement the steps of the method embodiments. In some apparatus embodiments each of the CBSDs, user equipment devices, SAS devices and each of the other apparatus/devices of the system include one or more processors and/or hardware circuitry, input/output interfaces including receivers and transmitters, and a memory. The memory including instructions when executed by one or more of the processors control the apparatus/device of the system to operate to perform the steps of various method embodiments of the invention.

The present invention is also applicable to and includes apparatus and systems such as for example, apparatus and systems that implement the steps of the method embodiments. For example, a Spectrum Access System (SAS) in accordance with one embodiment of the present invention includes: memory; an input/output interface including at least one receiver and at least one transmitter; and one or more processors that control the SAS to: receive, from a first Citizens Broadband Radio Service Device (CBSD), first user equipment (UE) information including at least one of timing advance or power headroom information for one or more UEs using or in communication with said first CBSD; estimate, based on the received first UE information, a first CBSD coverage area; and make a first resource allocation to the first CBSD based on the estimated first CBSD coverage area, said first resource allocation including an allocation of at least one of a frequency bandwidth allocation or transmission power allocation to the first CBSD. In some embodiments, the one or more processors further control the SAS to communicate the resource allocation to the first CBSD.

The one or more processors of the SAS may also control the SAS so that prior to estimating the first CBSD coverage area, the SAS identifies the UE in communication with the first CBSD with the largest timing advance; and determines if the UE in communication with the first CBSD having the largest timing advance also has the lowest power headroom of the UEs for which power headroom information is provided in said first UE information.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 2 illustrates the combination of FIGS. 2A and 2B.

FIG. 2B illustrates the steps of the second part of an exemplary method in accordance with one embodiment of the present invention.

FIG. 11 illustrates the combination of FIGS. 11A, 11B and 11C.

FIG. 11B illustrates the steps of the second part of an exemplary method in accordance with one embodiment of the present invention.

DETAILED DESCRIPTION

Figure 1:
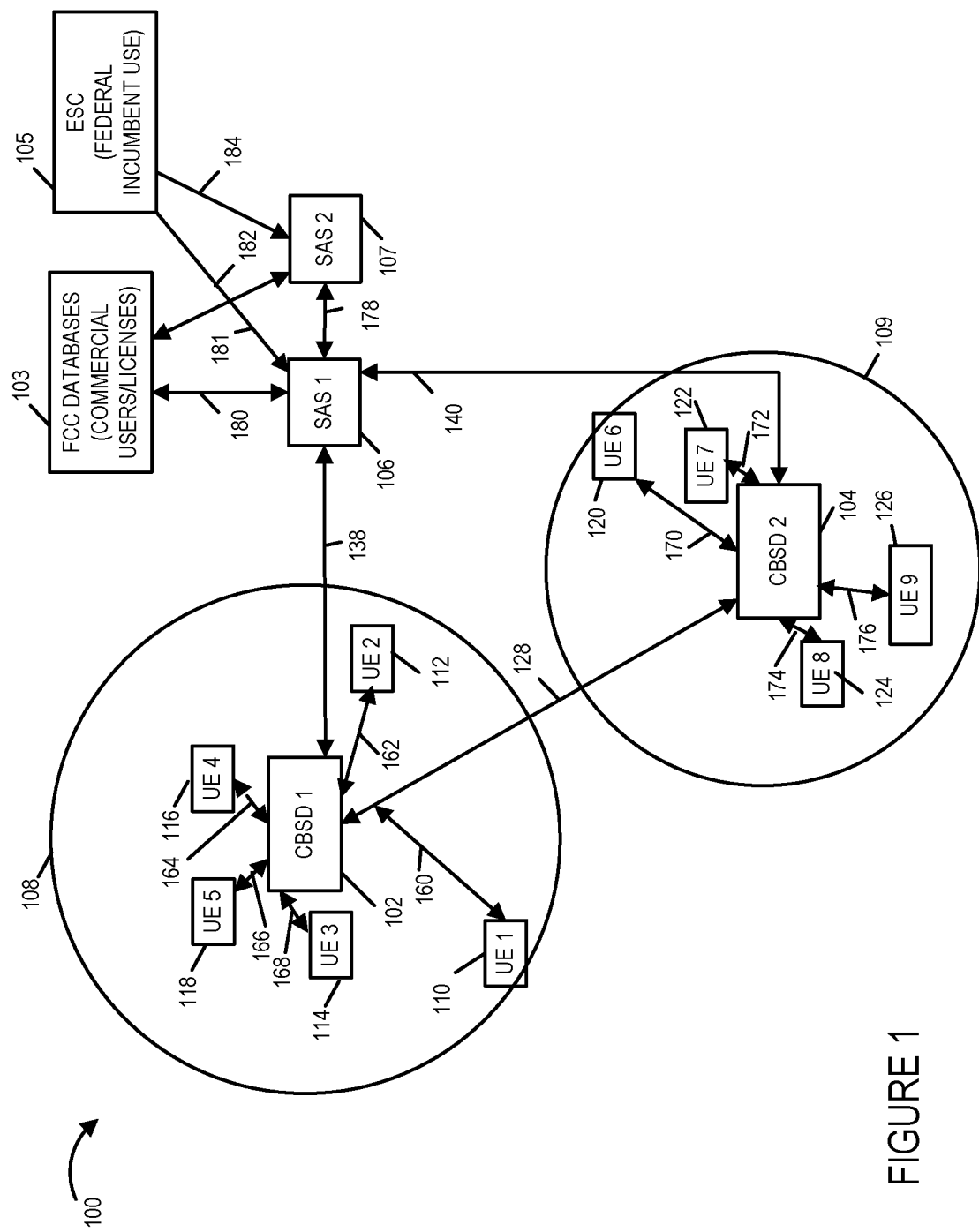
FIG. 1 illustrates an exemplary Citizens Broadband Radio Service network system 100 that provides wireless communications services in accordance one embodiment of the present invention.

The current invention is applicable to Citizens Broadband Radio Service (CBRS) networks that provide wireless communications services. The present invention relates to methods, systems and apparatus to estimate coverage of Citizens Broadband Radio Service Devices (CBSDs) using power headroom and/or timing advance information and to use the coverage estimates to more effectively and efficiently allocate spectrum and manage electromagnetic interference by adjusting CBSD transmission power levels based on the estimated coverage area.

Citizens Broadband Radio Service networks are networks that include user equipment devices, e.g., mobile or wireless devices such as for example cell phones, smart phones, laptops, tablets, Citizens Broadband Radio Service Devices (CBSDs) which serve as access points/base stations, and Spectrum Access Systems which provides spectrum assignments and manages frequency interference through power management of the CBSDs transmission power. The Citizens Broadband Radio Service network utilizes the 150 megahetz in the 3550-3700 MHz band referred to as the 3.5 GHz Band. One important aspect of the CBRS network is the limitation of interference, e.g., radio transmission, from multiple transmission sources, e.g., multiple CBSD devices located near each other or in close proximity to one another. The CBRS network includes Spectrum Access Systems that obtain information about registered or licensed commercial users in the 3.5 GHz band from FCC databases and information about federal incumbent users of the band from ESC (Environmental Sensing Capability) system and interact directly or indirectly with CBSDs operating in the band to ensure that Citizens Broadband Radio Service users operate in a manner consistent with their authorizations and promote efficient use of the spectrum resource. Among the Spectrum Access System functions as defined in the Amendment of the Commission's Rules with Regard to Commercial Operations in the 3550-3650 MHz Band released Apr. 21, 2015 are that: it determines the available frequencies at a given geographic location and assign them to CBSDs; it determines the maximum permissible transmission power level for CBSDs at a given location and communicates that information to the CBSDs; it registers and authenticates the identification information and location of CBSDs; it enforces exclusion and protection zones, including any future changes to such Zones, to ensure compatibility between Citizens Broadband Radio Service users and incumbent federal operations; it protects Priority Access Licensees (PAL) from impermissible interference from other Citizens Broadband Radio Service users; ensures secure and reliable transmission of information between the SAS, ESC, and CBSDs; and it facilitates coordination and information exchange between SASs. Through the management of the CBSDs power transmission levels in a geographical area the SAS manages the radio interference in the geographical area.

Various embodiments of the present invention describe methods, apparatus, systems and techniques for providing accurate estimates for a Citizens Broadcast Radio Service Device's coverage area in a CBRS network for example by a Spectrum Access System and efficiently allocating resources, e.g., frequency bandwidth and or transmission power, based on the estimates. Various embodiments use reported user equipment device timing advance and/or power headroom information in making the estimates. In various embodiments, statistical analysis is performed on user equipment device power headroom and timing advance values to generate a CBSD's coverage area.

FIG. 1 illustrates an exemplary CBRS network communications system 100 having an architecture implemented in accordance with the present invention. The CBRS communications network system 100 includes a Citizens Broadcast Radio Service Device (CBSD) 1 102, a CBSD 2 104, a Spectrum Access System device 1 (SAS 1) 106, a SAS 2 107, an FCC Databases of commercial users/licenses 103, an Environmental Sensing Capability (Federal Incumbent Use) (ESC) system 105, a plurality of user equipment (UE) devices UE 1 110, UE 2 112, UE 3 114, UE 4 116, UE 5 118, UE 6 120, UE 7 122, UE 8 124, and UE 9 126, communications links 128, 138, 140, 160, 162, 164, 166, 168, 170, 172, 174, 176, 178, 180, 181, 182, 184, a first cell 108 and a second cell 109.

The first cell 108 of the CBRS network is serviced by CBSD 1 102. The first cell 108 illustrates the wireless coverage range of CBSD 1 102 at a first time T1. The user equipment devices also sometimes referred to as user terminal devices UE 1 110, UE 2 112, UE 3 114, UE 4 116, and UE 5 118 are located in the first cell 108 are in active wireless communications with CBSD 1 102. Communications links 160, 162, 164, 166, and 168 illustrate wireless communications channels, e.g., radio channels, over which CBSD 1 102 and UE 1 110, UE 2 112, UE 3 114, UE 4 116, and UE 5 118 communicate respectively.

The second cell 109 of the CBRS network is serviced by CBSD 2 104. The second cell 109 illustrates the wireless coverage range of CBSD 2 104 at the first time T1. The user equipment devices UE 6 120, UE 7 122, UE 8 124 and UE 9 126 are located in a second cell 109 and are in communication with CBSD 2 104. Communications links 170, 172, 174 and 176 illustrate wireless communications channels, e.g., radio channels, over which CBSD 2 102 and UE 6 120, UE 7 122, UE 8 124, and UE 9 126 communicate respectively.

SAS 1 106 is coupled to SAS 2 107 via communications link 178. SAS 1 106 is coupled to FCC Databases 103 via communications link 180. SAS 2 107 is coupled to FCC Databases 103 via communications link 181. ESC system 105 is coupled to SAS 1 106 and SAS 2 107 via communications links 182 and 184. The ESC system is used to detect, sense Navy radar operations in CBRS operation within 3550-3650 MHz near the coasts and provide notifications over the communications links to SAS 1 106 and SAS 2 107. SAS 1 106 manages the CBSD 1 102 and CBSD 2 104 spectrum allocation and transmission power to limit interference in the CBRS network. SAS 2 107 manages other CBSDs in the CBRS network which are not shown in FIG. 1. SAS 1 106 and SAS 2 107 communicate and share information regarding the CBRS network coverage of the CBSDs each respectively manage and coordinate management of the allocation of spectrum and power transmission levels of CBSDs throughout the CBRS network. While only two SAS devices are shown in FIG. 1 it should be understood that additional SAS devices are typically used in the CBRS network. The communications link 128 couples CBSD 1 102 to CBSD 2 104.

The communications links 128, 138, 140, 178, 180, 182, and 184 are typically wired communications links or fiber optic cables. The communications links 160, 162, 164, 166, 168, 170, 172, 174 and 176 are wireless or over the air communications links. It is to be understood that the communication links shown in system 100 are only exemplary and other network configurations and communications links may be employed that couple together the devices, servers, nodes, entities, databases and controllers of the system. Elements or steps with the same reference numbers used in different figures are the same or similar and those elements or steps will not be described in detail again.

While for the sake of simplicity in explaining the invention system 100 only illustrates two active CBSD devices, two SAS devices and a few UE devices, it will be appreciated that system 100 typically includes a large plurality of active CBSDs in the CBRS network supporting a large plurality of UE devices and being managed by a plurality of SAS devices which are in communication with one another.

Figure 3:
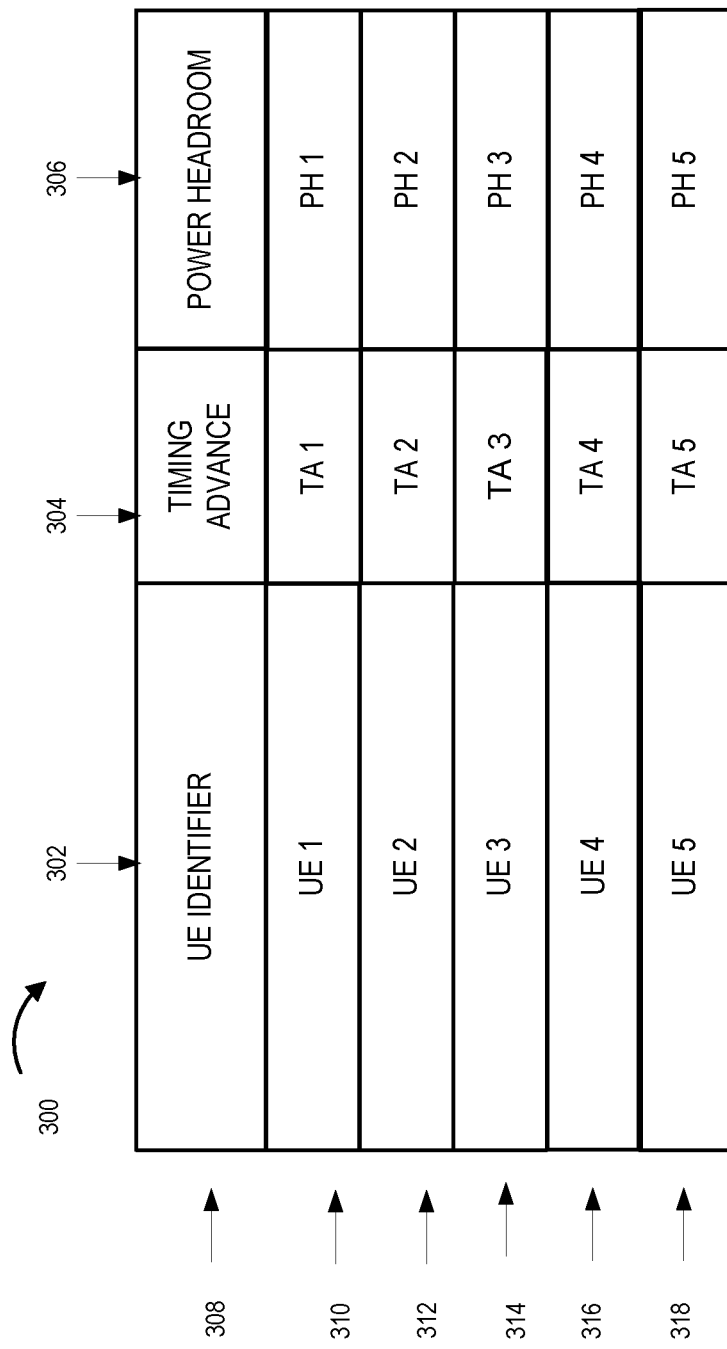
FIG. 3 illustrates a table of user equipment devices and corresponding timing advance and power headroom information.

FIG. 3 illustrates a table 300 of indexed user equipment devices with corresponding timing advance and power headroom information. Row 308 of table 300 illustrates labels identifying the information contained in each column and are not data. The entries in column 302 of table 300 include user equipment device identifiers for the UEs in communication with a CBSD, e.g., CBSD 1 102. The user equipment device identifiers can be any identifier that uniquely identifies the user equipment device. Exemplary user equipment device identifiers include International Mobile Subscriber Identity (IMSI) numbers and International Mobile Equipment Identity (IMEI) numbers. The entries in column 304 of table 300 include timing advance information for the UEs in communication with the CBSD identified in the same row. The entries in column 306 of table 300 include power headroom information for the UEs in communication with the CBSD identified in the same row. The entries of row 310 indicate UE 1 has timing advance TA 1 and power headroom PH 1. The entries of row 312 indicate UE 2 has timing advance TA 2 and power headroom PH 2. The entries of row 314 indicate UE 3 has timing advance TA 3 and power headroom PH 3. The entries of row 316 indicate UE 4 has timing advance TA 4 and power headroom PH 4. The entries of row 318 indicate UE 5 has timing advance TA 5 and power headroom PH 5. TA 1, TA 2, TA 3, TA 4, TA 5 represent numerical timing advance values. PH 1, PH 2, PH 3, PH 4, and PH 5 represent numerical power headroom values.

Figure 3A:
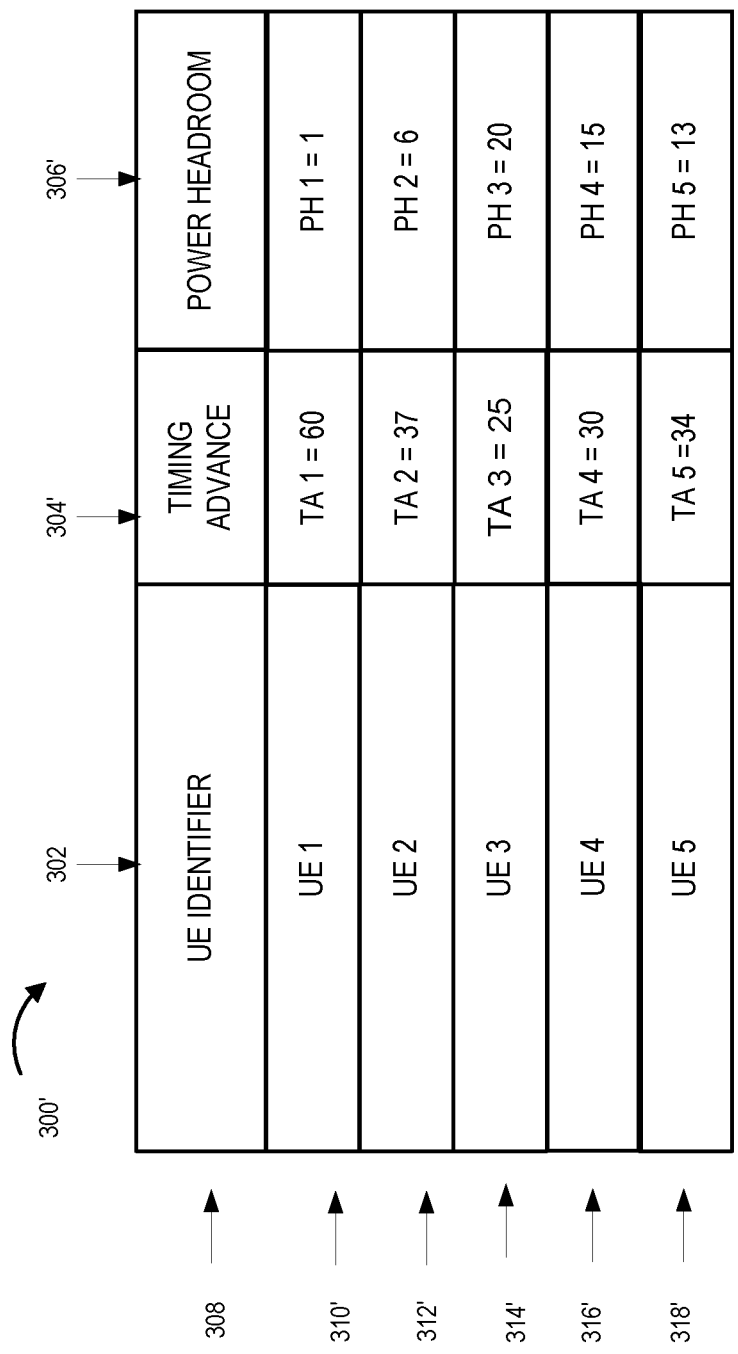
FIG. 3A illustrates a table of user equipment devices and corresponding timing advance and power headroom information provided with exemplary numerical values.

FIG. 3A illustrates exemplary UE timing advance and power headroom values for UEs in communication with the CBSD 1 102 provided to SAS 1 106. In this example, the timing advance values are whole integer numbers ranging from 0 to 63 and the power headroom values are whole integer numbers ranging from 0 to 23. Table 300' of FIG. 3A illustrates exemplary UE timing advance and power headroom values in columns 304' and 306'.

Figure 3B:
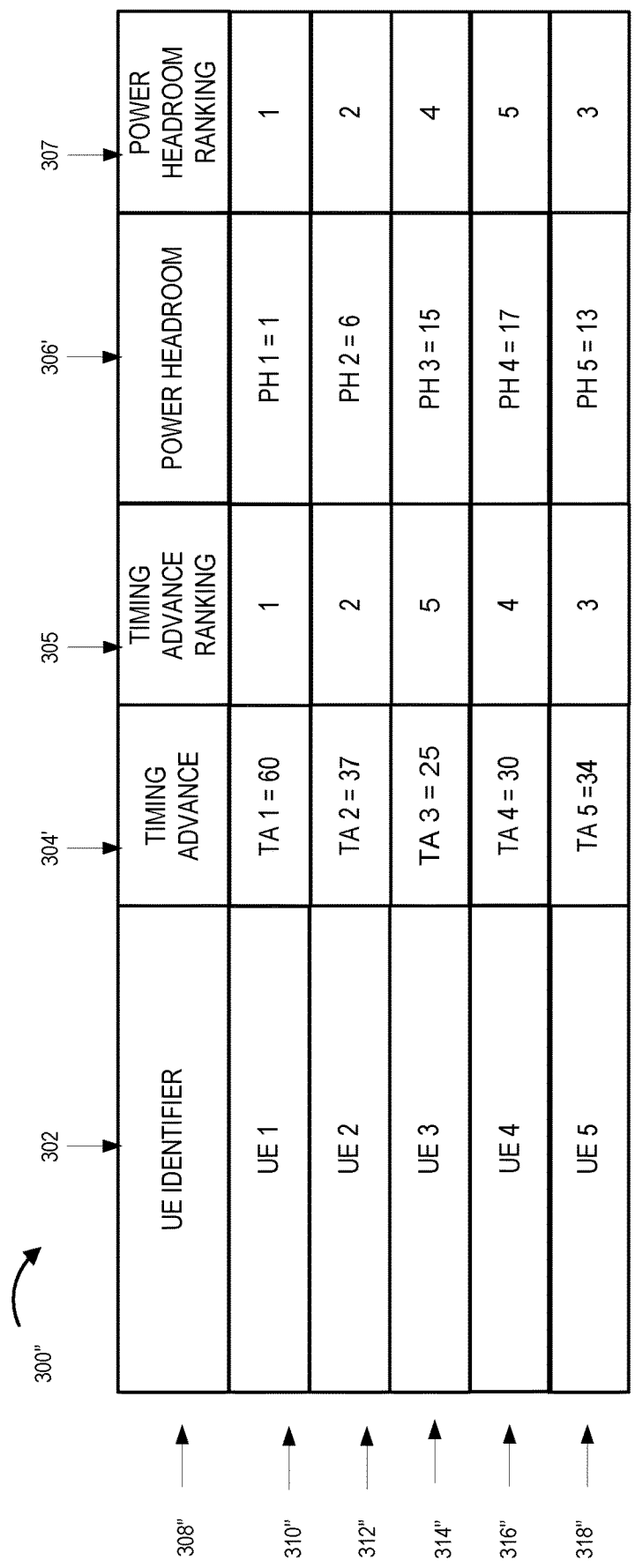
FIG. 3B illustrates a table of user equipment devices and corresponding timing advance and power headroom information and rankings.

FIG. 3B illustrates exemplary UE timing advance and power headroom values for UEs in communication with the CBSD 1 102 provided to SAS 1 106 along with timing advance and power headroom rankings. Table 300" includes row 310", row 312", row 314", row 316" and row 318" which each include respectively information pertaining to a particular UE in communication with the CBSD 1 102. The particular UE for the row being identified in the UE identifier column 302. Table 300" also includes additional columns 305 and 307 which were not included in table 300 or 300'. Table 300" of FIG. 3B includes column 305 showing UE timing advance rankings. The UE timing advance values are ranked from highest or largest timing advance values to lowest or shortest timing advance. The highest timing advance value being TA 1=60 having a TA ranking of 1 and corresponding to UE 1 (table 300" column 305 row 310"). Column 307 of table 300" shows UE power headroom rankings. The UE power headroom values are ranked from lowest or smallest to largest or highest. The lowest or smallest power headroom value being PH 1=1 having a PH ranking of 1 and corresponding to UE 1 (table 300" column 307, row 310). FIG. 1 illustrates that UE 1 110 is the furthest distance away from CBSD 1 102 and hence these rankings are consistent with the fact that UE 1 102 is UE in communication with the CBSD 1 102 that is the farthest from CBSD 1 102. The UE timing advance and power headroom values of table 300" illustrate the case where the UE with the largest or highest timing advance value is also the UE with the lowest power headroom value.

Figure 3C:
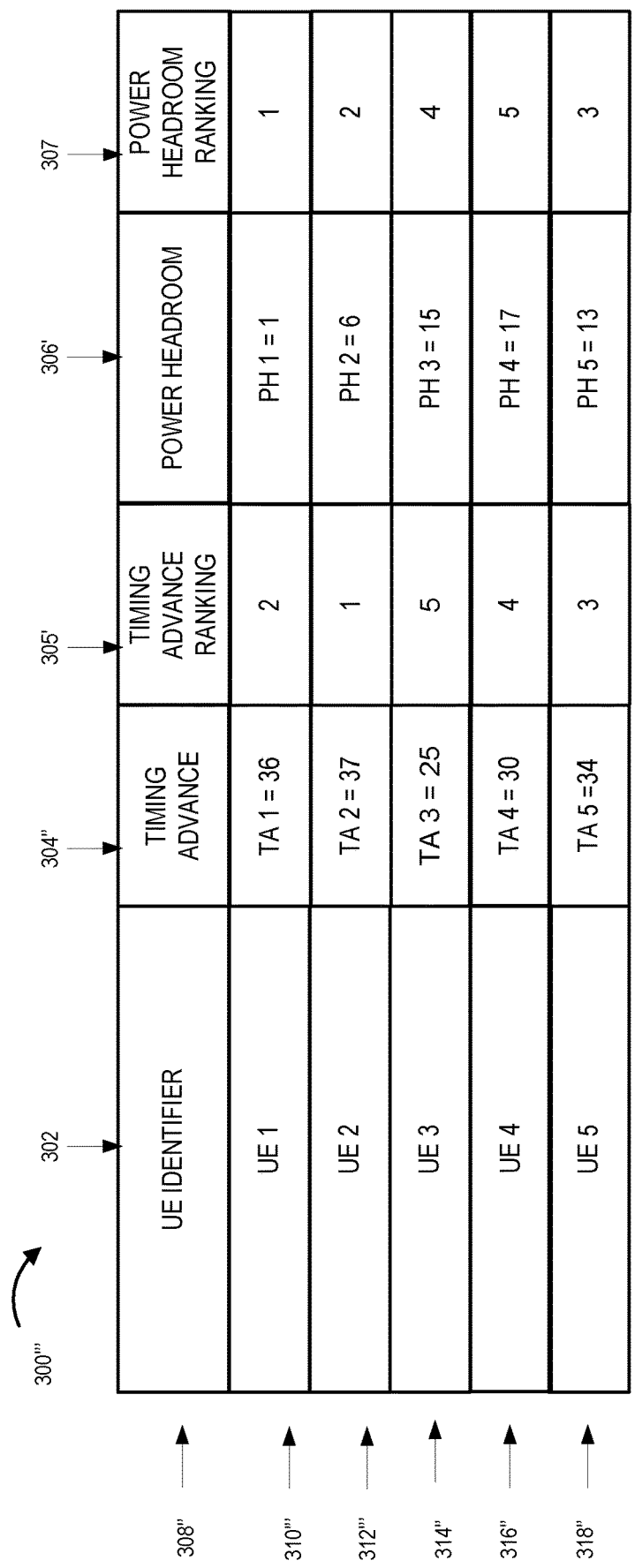
FIG. 3C illustrates a table of user equipment devices and corresponding timing advance and power headroom information and rankings that is different than user equipment device information and rankings shown in FIG. 3B.

FIG. 3C illustrates table 300'. Table 300''' includes rows 308", 310', 312''', 314", 316", and 318" and columns 302 (UE Identifier), 304" (Timing Advance), 305' (Timing Advance Ranking), 306' (Power Headroom) and 307 (Power Headroom Ranking). The difference between table 300" and table 300' is that UE 1 has a timing advance value of 36 (row 310', column 304") with a timing advance ranking of 2 (row 310''', column 305') and that UE 2 now has a timing advance ranking of 1 (row 312', column 305'). In this example, the UE 2 is the UE in communications with CBSD 1 102 with the highest or largest timing advance but it does not have the lowest power headroom value. UE 1 has the lowest power headroom of the UEs in communication with CBSD 1 102. When the method 1100 in FIG. 11 discussed below is executed, UE 2 will be eliminated or removed after it is determined that it is the UE with the highest timing advance but it does not have the lowest power headroom. After the elimination of UE 2 from consideration, the method 1100 will determine that UE 1 with a timing advance ranking of 2 is the UE with the highest timing advance and also the lowest power headroom.

Figure 12:
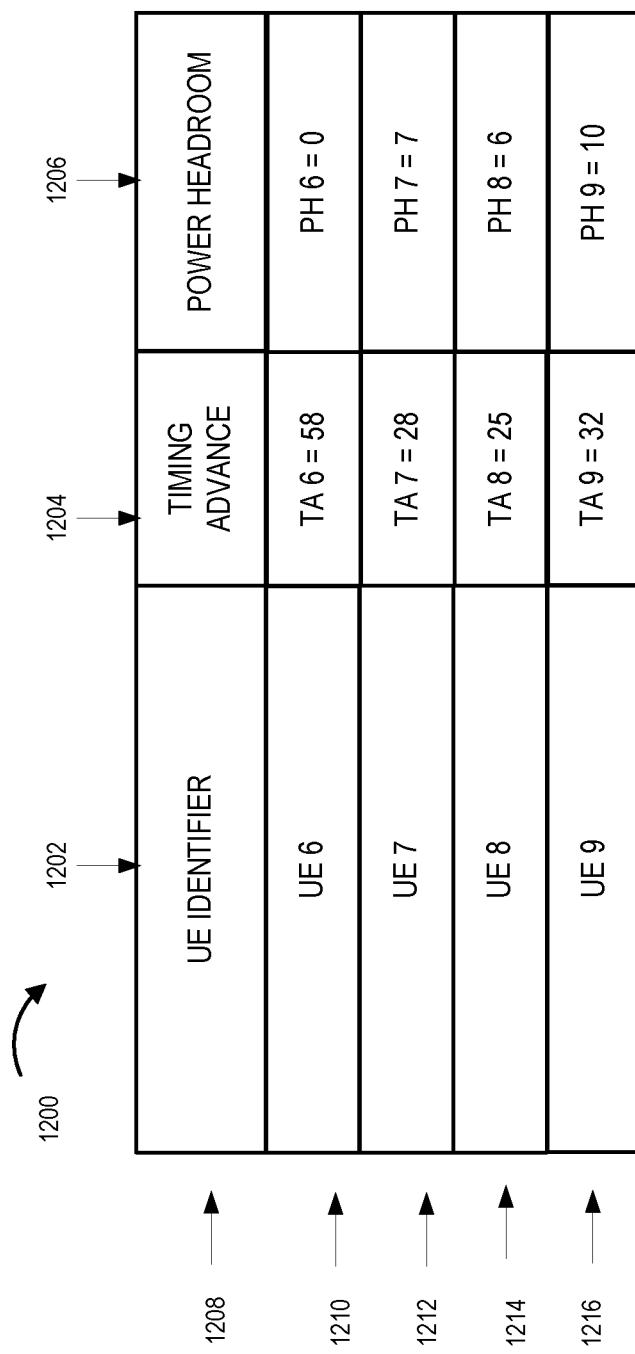
FIG. 12 illustrates an exemplary table of user equipment devices and corresponding timing advance and power headroom information.

FIG. 12 illustrates a table 1200 of indexed user equipment devices with corresponding timing advance and power headroom information. Row 1208 of table 1200 illustrates labels identifying the information contained in each column and are not data. The entries in column 1202 of table 1200 include user equipment device identifiers for the UEs in communication with a CBSD, e.g., CBSD 2 104. The entries in column 1204 of table 1200 include timing advance information for the UEs in communication with the CBSD identified in the same row. The entries in column 1206 of table 1200 include power headroom information for the UEs in communication with the CBSD identified in the same row. The entries of row 1210 indicate UE 6 has timing advance TA 6 and power headroom PH 6. The entries of row 1212 indicate UE 7 has timing advance TA 7 and power headroom PH 7. The entries of row 1214 indicate UE 8 has timing advance TA 8 and power headroom PH 8. The entries of row 1216 indicate UE 9 has timing advance TA 9 and power headroom PH 9. TA 6, TA 7, TA 8, and TA 9 represent numerical timing advance values. PH 6, PH 7, PH 8, and PH 9 represent numerical power headroom values. In table 1200 values have provided for the UE timing advance and power headroom values. These are values that may be, and in some embodiments, are provided to the SAS 1 106 for use in estimating the CBRS cell coverage area for CBSD 2 104.

Figure 4:
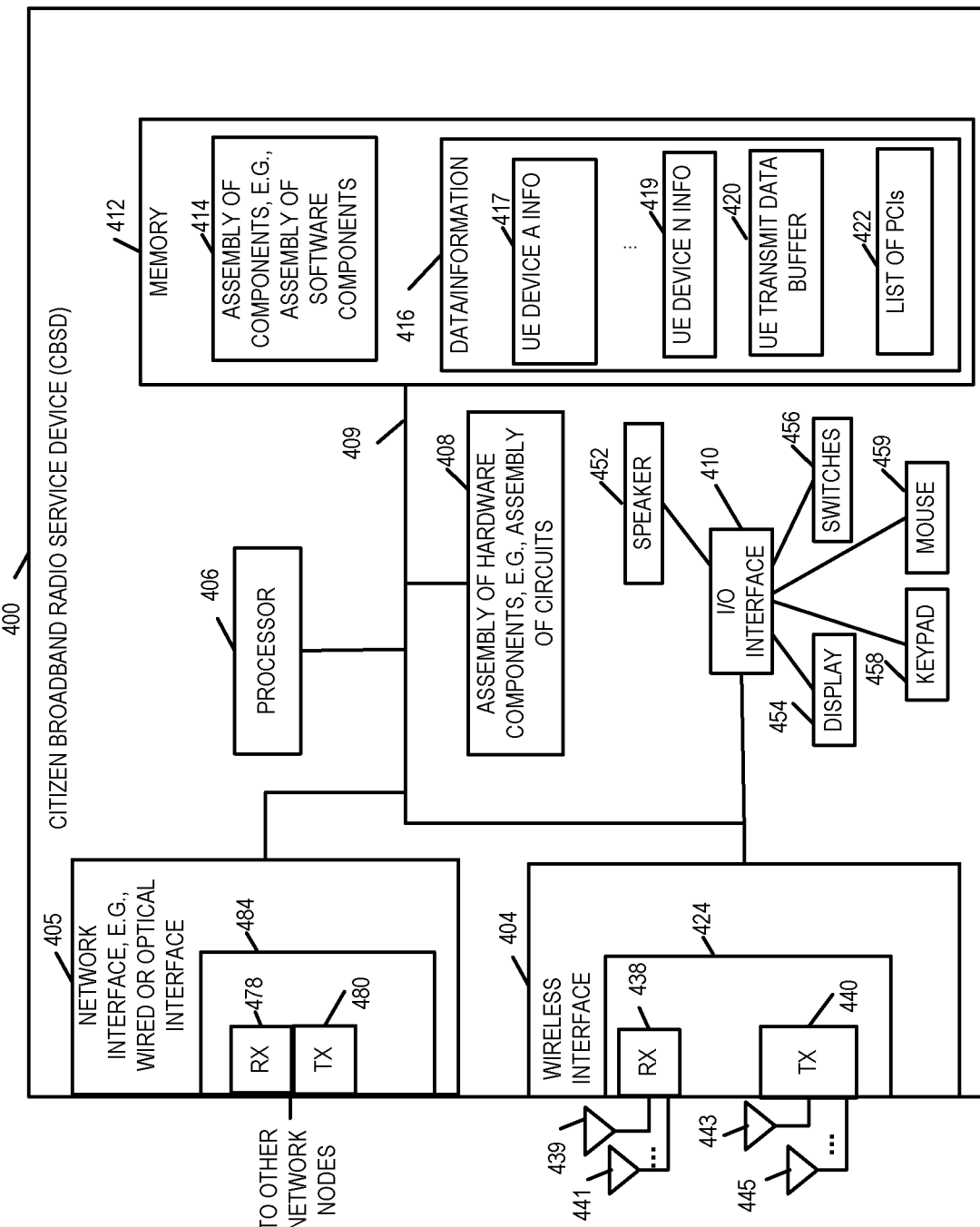
FIG. 4 illustrates details of an exemplary Citizens Broadband Radio Service Device (CBSD) in accordance with one embodiment of the present invention.

FIG. 4 is a drawing of an exemplary Citizens Broadband Radio Service Device (CBSD) 400 in accordance with an exemplary embodiment. The CBSD device 400, in some embodiments, incorporates Long Term Evolution (LTE), e.g., 4G LTE, eNodeB base station/access point capabilities such as determination of a user equipment device's timing advance and/or commands to request user equipment devices to report power headroom values. The CBSD device 400 also includes the capabilities of a CBSD as defined by the Federal Communications Commission's Rules with Regard to Commercial Operations in the 3550-3650 MHz Band. Exemplary CBSD device 400 includes a wireless interface 404, a network interface 405, e.g., a wired or optical interface, a processor 406, e.g., a CPU, an assembly of hardware components 408, e.g., an assembly of circuits, and I/O interface 410 and memory 412 coupled together via a bus 409 over which the various elements may interchange data and information. CBSD device 400 further includes a speaker 452, a display 454, switches 456, keypad 458 and mouse 459 coupled to I/O interface 410, via which the various I/O devices (452, 454, 456, 458, 459) may communicate with other elements (404, 406, 408, 412) of the CBSD device 400. Network interface 405 includes a receiver 478 and a transmitter 480. In some embodiments, receiver 478 and transmitter 480 are part of a transceiver 484. Wireless interface 404 includes a wireless receiver 438 and a wireless transmitter 440. In some embodiments, receiver 438 and transmitter 440 are part of a transceiver 442. In various embodiments, wireless interface 404 includes a plurality of wireless receivers and a plurality of wireless transmitters. Wireless receiver 438 is coupled to a plurality of receive antennas (receive antenna 1 439, . . . , receive antenna M 441), via which CBSD device 400 can receive wireless signal from other wireless communications devices including a second wireless communications device, e.g., a UE device. Wireless transmitter 440 is coupled to a plurality of wireless transmit antennas (transmit antenna 1 443, . . . , transmit antenna N 445) via which the CBSD 400 can transmit signals to other wireless communications devices including a second wireless communications device, e.g., a UE device. Memory 412 includes an assembly of component 414, e.g., an assembly of software components, and data/information 416. Data/information 416 includes UE device information corresponding to a plurality of user equipment devices (UE device A information 417, . . . , UE device N information 419 where A to N are the UE devices being serviced by the CBSD for example CBSD 1 102 UE 1 . . . UE 5 as shown in FIG. 1, UE transmit data buffer 420, and List of PCIs (Physical Cell Identifier List) 422. In some embodiments, CBSD 1 102 and/or CBSD 2 104, are implemented in accordance with CBSD 400.

Figure 5:
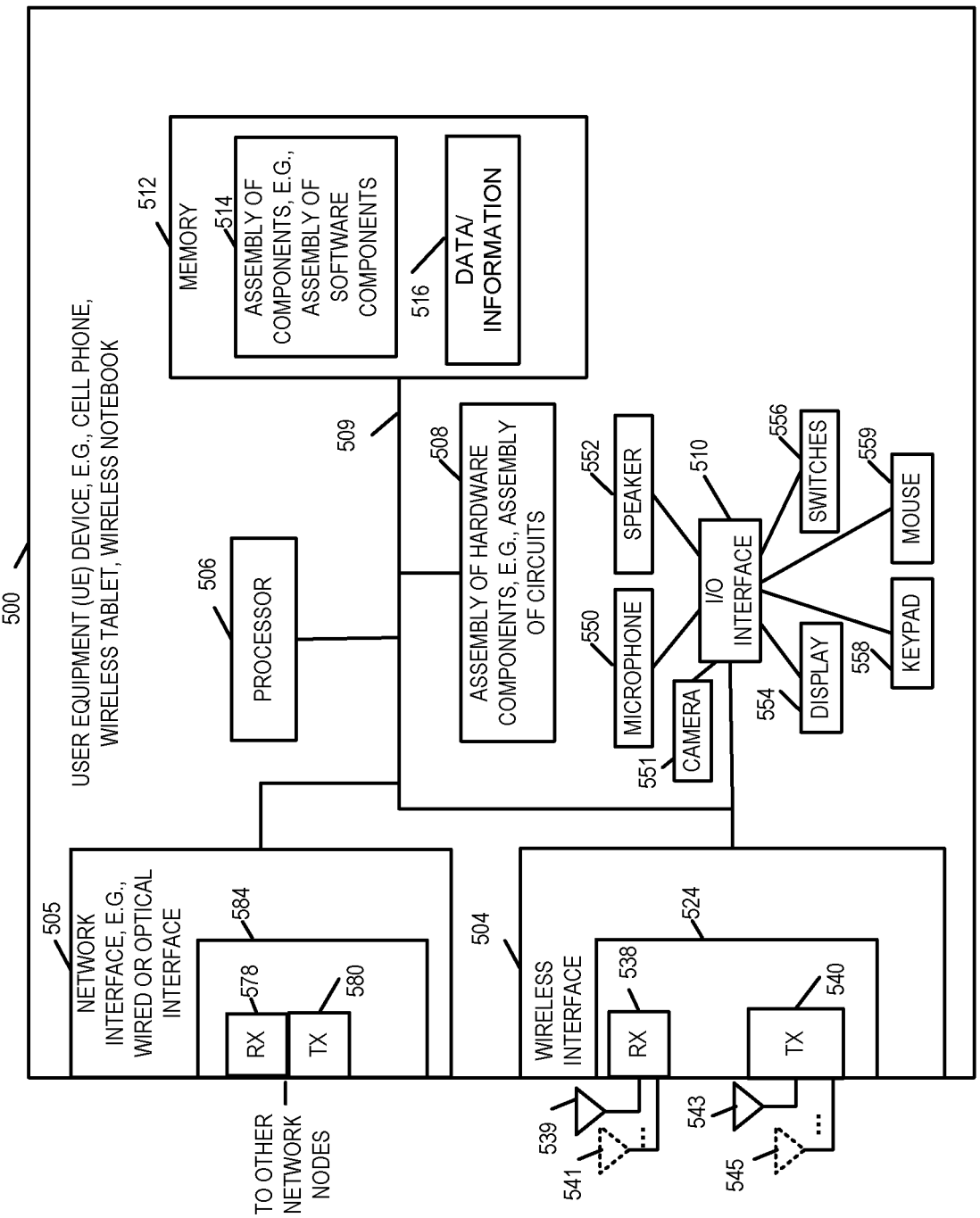
FIG. 5 illustrates details of an exemplary User Equipment (UE) device in accordance with one embodiment of the present invention.

FIG. 5 is a drawing of an exemplary user equipment (UE) device 500 in accordance with an exemplary embodiment. UE device 500 is, e.g., a mobile device such as a cell phone, a smart phone, wireless tablet or wireless notebook. UE device 500, in some embodiments, includes Long Term Evolution (LTE), e.g., 4G LTE, mobile device capabilities. Exemplary UE device 500 includes a wireless interface 504, a processor 506, e.g., a CPU, an assembly of hardware components 508, e.g., an assembly of circuits, and I/O interface 510 and memory 512 coupled together via a bus 509 over which the various elements may interchange data and information. UE device 500 further includes a microphone 550, camera 551, speaker 552, a display 554, e.g., a touch screen display, switches 556, keypad 558 and mouse 559 coupled to I/O interface 510, via which the various I/O devices (550, 551, 552, 554, 556, 558, 559) may communicate with other elements (504, 506, 508, 512) of the UE device. Network interface 505 includes a receiver 578 and a transmitter 580. In some embodiments, receiver 578 and transmitter 580 are part of a transceiver 584. Wireless interface 504 includes a wireless receiver 538 and a wireless transmitter 540. In some embodiments, receiver 538 and transmitter 540 are part of a transceiver 524. In various embodiments, wireless interface 504 includes a plurality of wireless receivers and a plurality of wireless transmitters. Wireless receiver 538 is coupled to one or more receive antennas (receive antenna 1 539, . . . , receive antenna M 541), via which UE device 500 can receive wireless signals from other wireless communications devices including, e.g., a CBSD device such as CBSD 400. Wireless transmitter 540 is coupled to one or more wireless transmit antennas (transmit antenna 1 543, . . . , transmit antenna N 545) via which the UE device 500 can transmit signals to other wireless communications device including a first wireless communications device, e.g., a CBSD 400. Memory 512 includes an assembly of components 514, e.g., an assembly of software components, and data/information 516.

Figure 6:
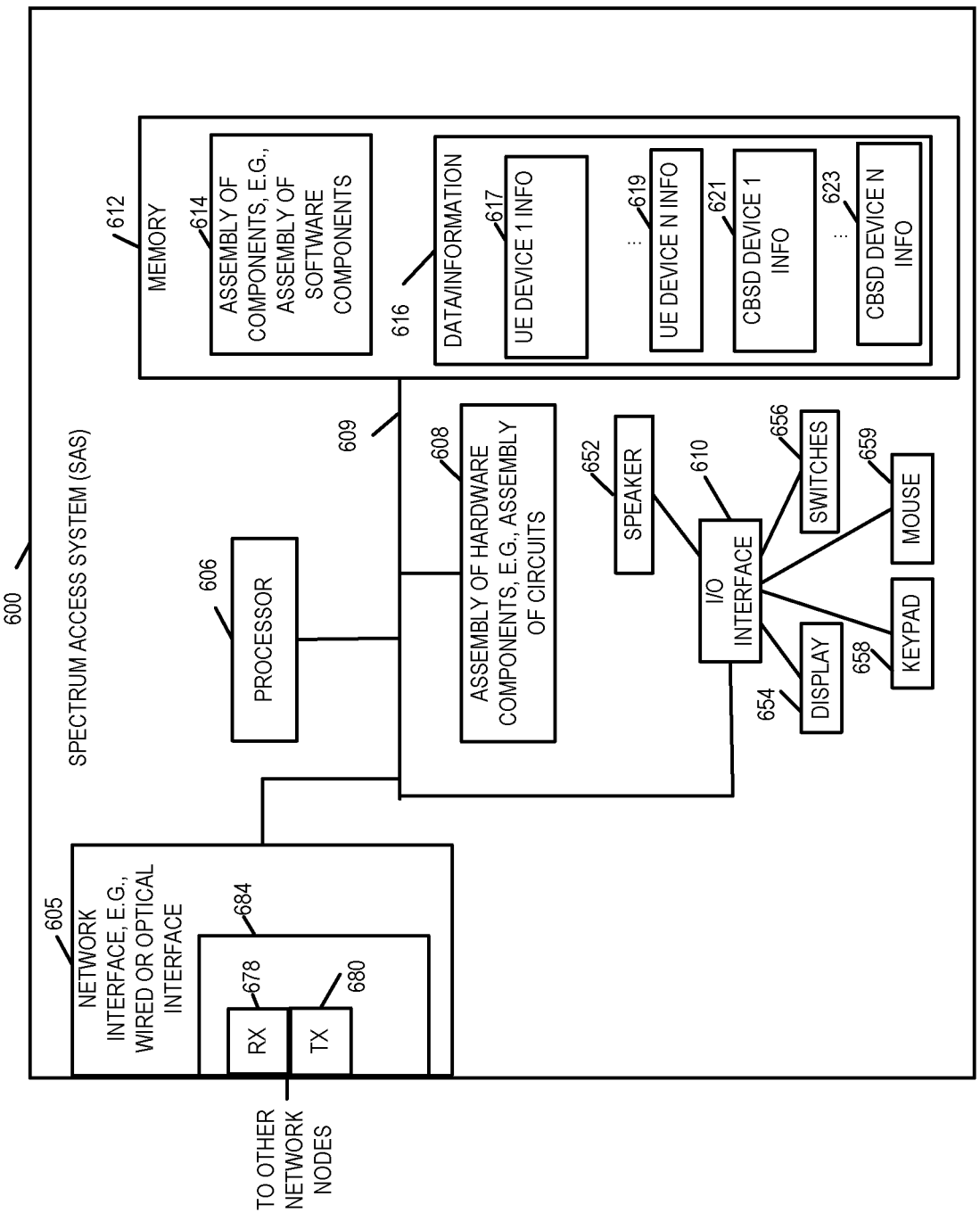
FIG. 6 illustrates details of an exemplary Spectrum Access System device (SAS) in accordance with one embodiment of the present invention.

FIG. 6 is a drawing of an exemplary Spectrum Access System (SAS) device 600 in accordance with an exemplary embodiment. The SAS 600 includes the capabilities of a SAS as defined by the Federal Communications Commission's Rules with Regard to Commercial Operations in the 3550-3650 MHz Band. Exemplary SAS device 600 includes a network interface 605, e.g., a wired or optical interface, a processor 606, e.g., a CPU, an assembly of hardware components 608, e.g., an assembly of circuits, and I/O interface 610 and memory 612 coupled together via a bus 609 over which the various elements may interchange data and information. SAS 600 further includes a speaker 652, a display 654, switches 656, keypad 658 and mouse 659 coupled to I/O interface 610, via which the various I/O devices (652, 654, 656, 658, 659) may communicate with other elements (606, 608, 612) of the SAS 600. Network interface 605 includes a receiver 678 and a transmitter 680. The network interface 605 is typically used to communicate with other SAS devices and CBSD devices. In some embodiments, receiver 678 and transmitter 680 are part of a transceiver 684. Memory 612 includes an assembly of component 614, e.g., an assembly of software components, and data/information 616. Data/information 616 includes UE device information corresponding to a plurality of UE devices (UE device 1 information 617 . . . UE device N information 619, where N is integer number. Data/information 616 also includes CBSD device information corresponding to a plurality of CBSD devices (CBSD device 1 information 621, . . . , CBSD device N information 623, where N is an integer number). Data/Information 616 also typically includes the UE power headroom and UE timing advance lists and the UE information included in FIGS. 3, 3A, 3B, 3C and 12, and CBDS device transmission power and spectrum allocation information. In some embodiments, SAS 1 106 is implemented in accordance with CBSD 400.

Figure 7:
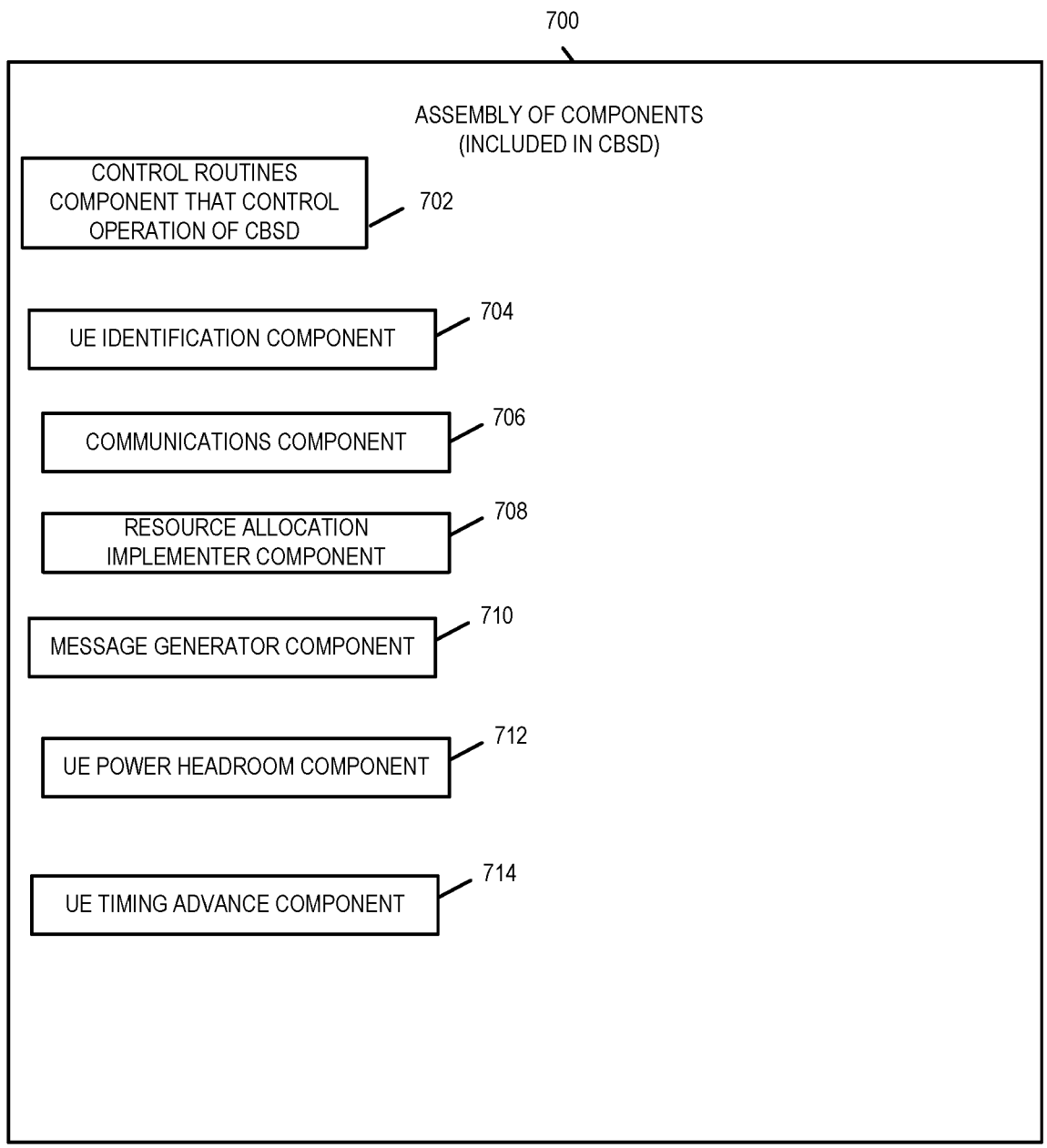
FIG. 7 illustrates an exemplary assembly of components for a CBSD in accordance with an embodiment of the present invention.

FIG. 7 is a drawing of an exemplary assembly of components 700 which may be included in an exemplary CBSD device, e.g., exemplary CBSD 400 of FIG. 4, in accordance with an exemplary embodiment. The components in the assembly of components 700 can, and in some embodiments are, implemented fully in hardware within a processor, e.g., processor 406, e.g., as individual circuits. The components in the assembly of components 700 can, and in some embodiments are, implemented fully in hardware within the assembly of hardware components 408, e.g., as individual circuits corresponding to the different components. In other embodiments some of the components are implemented, e.g., as circuits, within processor 406 with other components being implemented, e.g., as circuits within assembly of components 408, external to and coupled to the processor 406. As should be appreciated the level of integration of components on the processor and/or with some components being external to the processor may be one of design choice. Alternatively, rather than being implemented as circuits, all or some of the components may be implemented in software and stored in the memory 412 of the CBSD device 400, with the components controlling operation of CBSD device 400 to implement the functions corresponding to the components when the components are executed by a processor e.g., processor 406. In some such embodiments, the assembly of components 700 is included in the memory 412 as assembly of software components 414. In still other embodiments, various components in assembly of components 700 are implemented as a combination of hardware and software, e.g., with another circuit external to the processor providing input to the processor which then under software control operates to perform a portion of a component's function.

When implemented in software the components include code, which when executed by a processor, e.g., processor 406, configure the processor to implement the function corresponding to the component. In embodiments where the assembly of components 700 is stored in the memory 412, the memory 412 is a computer program product comprising a computer readable medium comprising code, e.g., individual code for each component, for causing at least one computer, e.g., processor 406, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the CBSD device 400 or elements therein such as the processor 406, to perform the functions of corresponding steps illustrated and/or described in the method of one or more of the flowcharts, signaling diagrams and/or described with respect to any of the Figures. Thus the assembly of components 700 includes various components that perform functions of corresponding one or more described and/or illustrated steps of an exemplary method.

Assembly of components 700 includes a control routines component 702, an UE identification component 704, a communications component 706, a resource allocation implementer component 708 that uses resources allocated to the CBSD by the SAS, e.g., the resource allocation implementer changes power transmission levels and/or frequency bandwidth based on instructions communicated from the SAS regarding the frequency bandwidth and/or transmission power allocated to the CBSD for example in response to an estimation of the CBSD's coverage area; a message generator component 710, a UE power headroom component 712 and a UE timing advance component 714. The control routines component 702 is configured to control operation of the CBSD. The message identification component 704 is configured to provide UE identification information in transmitted messages. The communication component 706 is configured to handle communications, e.g., transmission and reception of messages, and protocol signaling for the CBSD. The message generator component 710 is configured to generate messages for transmission to other devices. The UE power headroom component 712 is configured to obtain from a UE message the value of the UE's power headroom. In some embodiments, the UE power headroom component 712 ranks all UE power headroom values from lowest power headroom to highest power headroom. In some embodiments, UE power headroom component generates a UE power headroom report including UE power headroom information for communication to the SAS managing the CBSD. The UE timing advance component 714 is configured to determine, generate or calculate a timing advance value for each of the UEs in communication with the CBSD. In some embodiments, the UE timing advance component 714 ranks all UE timing advance values from highest or largest timing advance to lowest timing advance. In some embodiments, UE timing advance component generates a UE timing advance report including UE timing advance information for communication to the SAS managing the CBSD.

Figure 8:
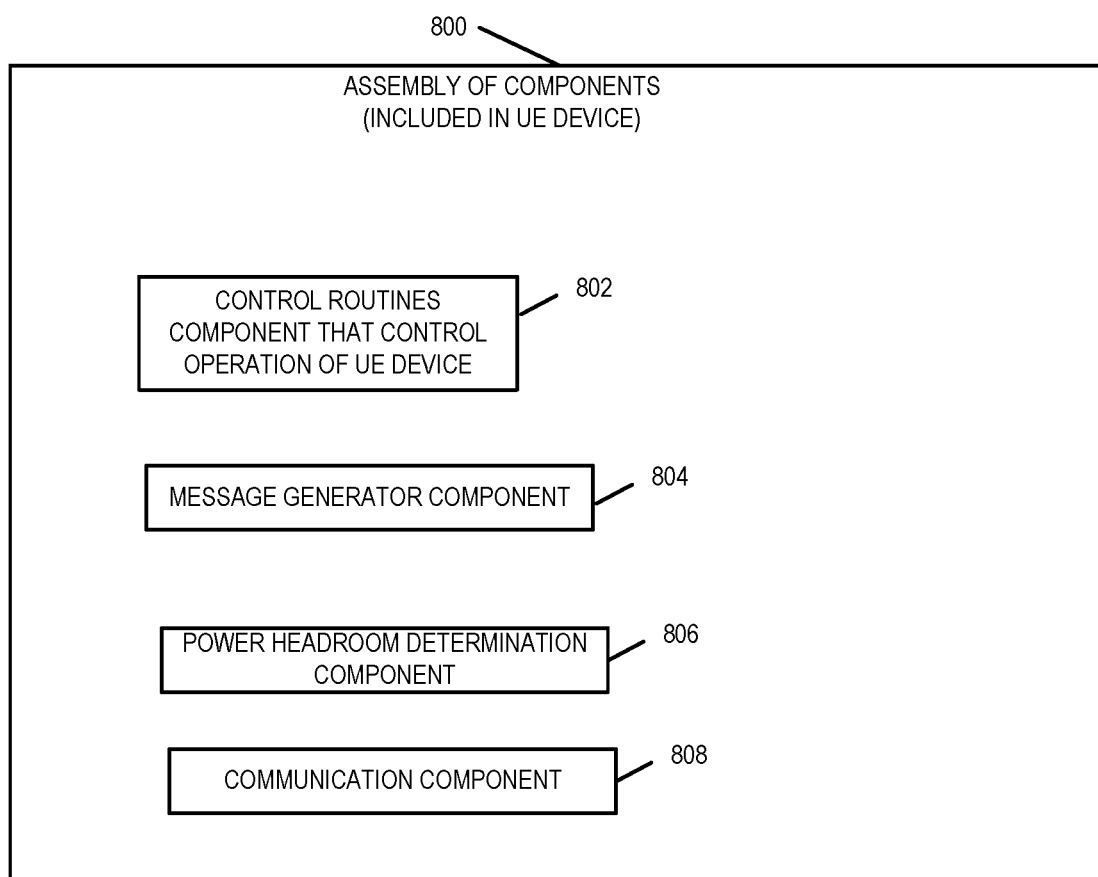
FIG. 8 illustrates an exemplary assembly of components for a user equipment device in accordance with an embodiment of the present invention.

FIG. 8 is a drawing of an exemplary assembly of components 800 which may be included in an exemplary user equipment (UE) device, e.g., UE device 500 of FIG. 5, in accordance with an exemplary embodiment. The components in the assembly of components 800 can, and in some embodiments are, implemented fully in hardware within a processor, e.g., processor 506, e.g., as individual circuits. The components in the assembly of components 800 can, and in some embodiments are, implemented fully in hardware within the assembly of hardware components 508, e.g., as individual circuits corresponding to the different components. In other embodiments some of the components are implemented, e.g., as circuits, within processor 506 with other components being implemented, e.g., as circuits within assembly of components 508, external to and coupled to the processor 506. As should be appreciated the level of integration of components on the processor and/or with some components being external to the processor may be one of design choice. Alternatively, rather than being implemented as circuits, all or some of the components may be implemented in software and stored in the memory 512 of the UE device 500, with the components controlling operation of UE device 500 to implement the functions corresponding to the components when the components are executed by a processor e.g., processor 506. In some such embodiments, the assembly of components 800 is included in the memory 512 as assembly of software components 514. In still other embodiments, various components in assembly of components 800 are implemented as a combination of hardware and software, e.g., with another circuit external to the processor providing input to the processor which then under software control operates to perform a portion of a component's function. When implemented in software the components include code, which when executed by a processor, e.g., processor 506, configure the processor to implement the function corresponding to the component. In embodiments where the assembly of components 800 is stored in the memory 512, the memory 512 is a computer program product comprising a computer readable medium comprising code, e.g., individual code for each component, for causing at least one computer, e.g., processor 506, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the UE device 500 or elements therein such as the processor 506, to perform the functions of corresponding steps illustrated and/or described in the method of one or more of the flowcharts, signaling diagrams and/or described with respect to any of the Figures. Thus the assembly of components 800 includes various components that perform functions of corresponding one or more described and/or illustrated steps of an exemplary method.

Assembly of components 800 includes a control routines component 802, a message generator component 804, a power headroom determination component 806, a communication component 818. The control routines component 802 is configured to control operation of the UE. The message generator component 804 is configured to generate messages for transmission to CBSD devices. The power headroom determination component 806 is configured to determine a power headroom value for the user equipment device, e.g., to provide to the CBSD device servicing the UE. The communication component 808 is configured to handle communications, e.g., receipt and transmission of signals and provide protocol signal processing for one or protocols for the UE.

Figure 9:
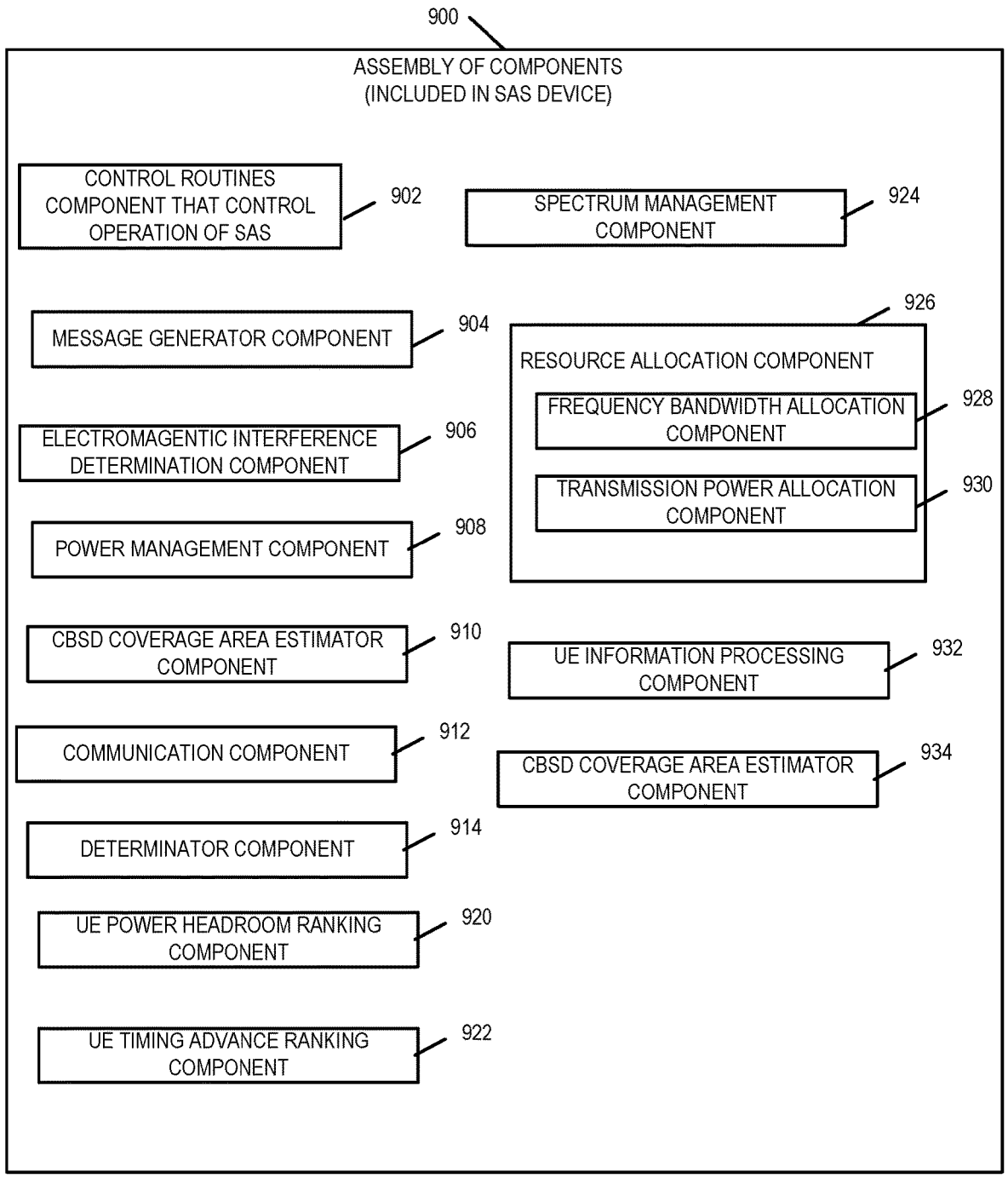
FIG. 9 illustrates an exemplary assembly of components for a SAS device in accordance with an embodiment of the present invention.

FIG. 9 is a drawing of an exemplary assembly of components 900 which may be included in an exemplary SAS device, e.g., exemplary SAS 600 of FIG. 6, in accordance with an exemplary embodiment. The components in the assembly of components 900 can, and in some embodiments are, implemented fully in hardware within a processor, e.g., processor 606, e.g., as individual circuits. The components in the assembly of components 900 can, and in some embodiments are, implemented fully in hardware within the assembly of hardware components 608, e.g., as individual circuits corresponding to the different components. In other embodiments some of the components are implemented, e.g., as circuits, within processor 606 with other components being implemented, e.g., as circuits within assembly of components 608, external to and coupled to the processor 606. As should be appreciated the level of integration of components on the processor and/or with some components being external to the processor may be one of design choice. Alternatively, rather than being implemented as circuits, all or some of the components may be implemented in software and stored in the memory 612 of the SAS 600, with the components controlling operation of SAS 600 to implement the functions corresponding to the components when the components are executed by a processor e.g., processor 606. In some such embodiments, the assembly of components 900 is included in the memory 612 as assembly of software components 614. In still other embodiments, various components in assembly of components 900 are implemented as a combination of hardware and software, e.g., with another circuit external to the processor providing input to the processor which then under software control operates to perform a portion of a component's function.

When implemented in software the components include code, which when executed by a processor, e.g., processor 606, configure the processor to implement the function corresponding to the component. In embodiments where the assembly of components 900 is stored in the memory 612, the memory 612 is a computer program product comprising a computer readable medium comprising code, e.g., individual code for each component, for causing at least one computer, e.g., processor 606, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 9 control and/or configure the SAS 600 or elements therein such as the processor 606, to perform the functions of corresponding steps illustrated and/or described in the method of one or more of the flowcharts, signaling diagrams and/or described with respect to any of the Figures. Thus the assembly of components 900 includes various components that perform functions of corresponding one or more described and/or illustrated steps of an exemplary method.

Assembly of components 900 includes a control routines component 902, a message generator component 904, an electromagnetic interference determination component 906, a power management component 908, CBSD coverage area estimator component 910, communication component 912, determinator component 914, UE power headroom ranking component 920, UE timing advance ranking component 922, spectrum management component 924, a resource allocation component 926, a UE information processing component 932, and a CBSD coverage area estimator component 934. The resource allocation component 926 includes in a frequency bandwidth allocation component 928 and a transmission power allocation component 930. The control routines component 902 is configured to control operation of the SAS. The message generator component 904 is configured to generate messages for transmission to CBSD devices, e.g., resource allocations messages including frequency bandwidth allocated to a CBSD and transmission power allocations for the CBSD. The electromagnetic interference determination component is configured to determine actual or potential electromagnetic interference to be caused by wireless, e.g., radio transmission from active CBSD devices or CBSDs devices which are to become active. The power management component 908 is configured to manage power transmission levels to maximize usage of spectrum while minimizing interference and in some embodiments is a sub-component of the resource allocation component.

The power management component 908 determines the power transmission levels for CBSDs managed by the SAS and in some embodiments are sub-components of the resource allocation component 926. The spectrum management component 924 is configured to manage the allocation of frequency spectrum in the CBRS network including frequency bandwidth allocated to CBSDs managed by the SAS. In some embodiments, the spectrum management component 924 is a sub-component of resource allocation component 926. The communication component 912 is configured to handle communications between the SAS and other nodes, e.g., CBSD device, FCC database, ESC system including receipt and transmission of messages and protocol signaling. The UE power headroom ranking component 920 is configured to rank user equipment device power headroom values from lowest power headroom to largest power headroom. In some embodiments, the UE power headroom ranking component 920 also generates UE lists of the UEs and their power headroom value and power headroom ranking from UE power headroom information received from a CBSD. The UE timing advance ranking component 922 is configured to rank user equipment device timing advance values from highest or largest timing advance to lowest or smallest timing advance value. In some embodiments, the UE timing advance value ranking component 922 also generates UE lists of the UEs and their timing advance value and timing advance value ranking from UE timing advance value information received from a CBSD.

The determinator component 914 is configured to make one or more decisions or determinations such as for example, determine if the UE in communication with the first CBSD having the largest timing advance also has the lowest power headroom of the UEs for which power headroom information is provided to the SAS for the first CBSD; determine an average UE timing advance value; determine an average UE power headroom value; determine an estimate of a CBSD coverage area based on UE power headroom and timing advance information; determine UEs having a timing advance value in a range of timing advance values; determine UEs having a power headroom value in a range of power headroom values; determine UEs having both a timing advance value within a range of timing advance values and a power headroom value within a range of power headroom values; determine standard deviation of the power headroom values of UEs using or in communication with a CBSD, determine standard deviation of the timing advance values of UEs using or in communication with a CBSD; and determining resource allocations based on an estimated CBSD coverage area.

The resource allocation component 926 is configured to allocate resources including for example frequency bandwidth allocations and/or transmission power allocations for CBSDs managed by the SAS and based on estimations of the CBSDs' coverage area. In some embodiments, the resource allocation component 926 includes sub-components frequency bandwidth allocation component 928 and transmission power allocation component 930. The frequency bandwidth allocation component 928 is configured to allocate frequency bandwidth for a CBSD based on the estimated coverage area of the CBSD which in turn is based on the UE power headroom and timing advance information provided to the SAS. The transmission power allocation component 930 is configured to allocate transmission power to a CBSD based on the estimated coverage area of the CBSD which in turn is based on the UE power headroom and timing advance information provided to the SAS.

The UE information processing component 932 is configured to process UE information received by the SAS from a CBSD corresponding to multiple UEs to determine at least one of a timing advance or power headroom value to be used in determining the coverage area of the CBSD which provided the UE information. In some embodiments, the UE information processing component 932 is configured to perform statistical analysis of the UE information to determine the at least one of a timing advance or power headroom value to be used in determining the coverage area of the CBSD which provided the UE information.

The CBSD coverage area estimator component is configured to generate an estimation of a CBSD's coverage area based on UE information provided to the SAS including UE power headroom information and/or UE timing advance information for UEs in communication with the CBSD for which the UE information has been provided.

Figure 2A:
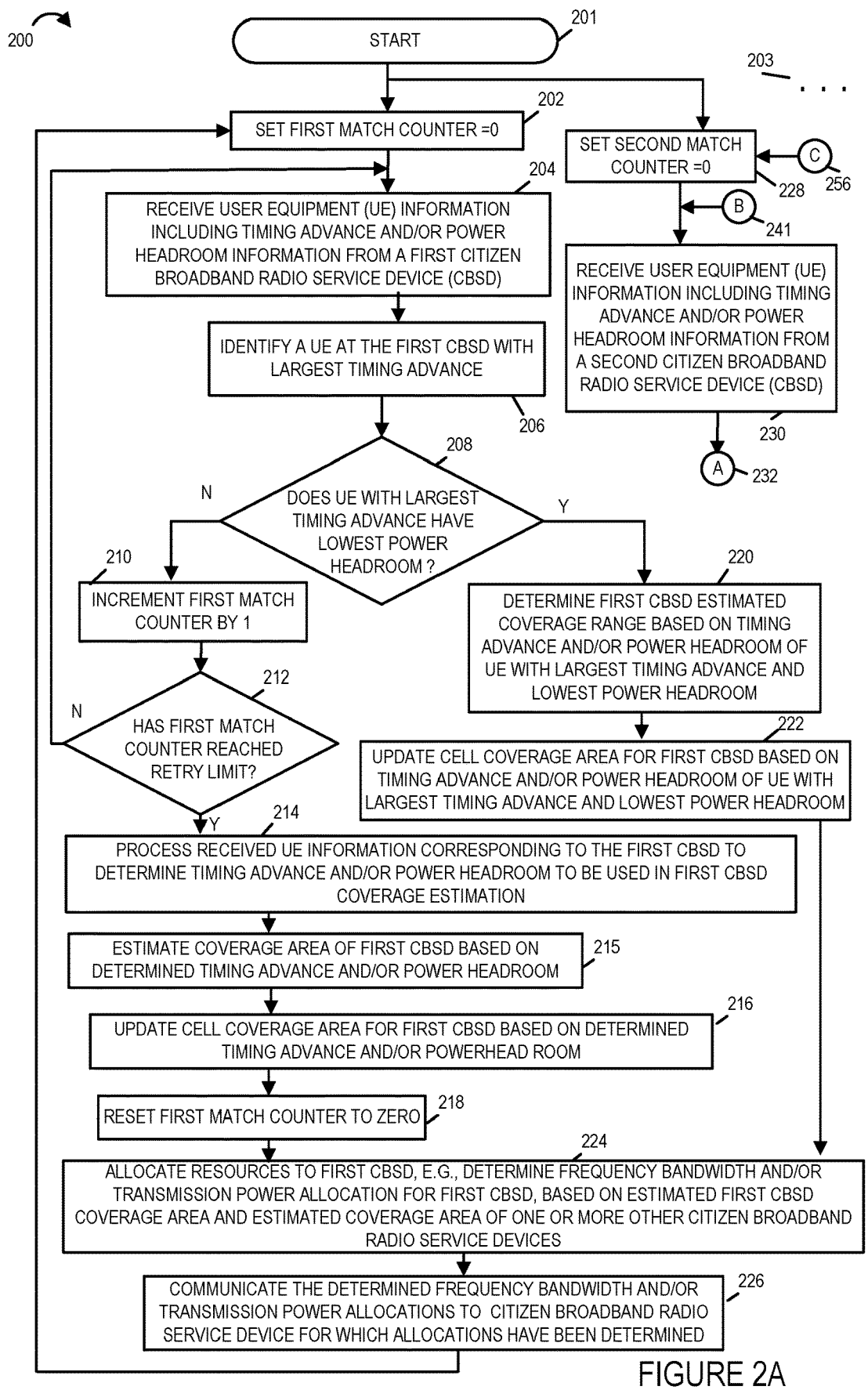
FIG. 2A illustrates the steps of the first part of an exemplary method in accordance with one embodiment of the present invention.

FIG. 2, which comprises the combination of FIGS. 2A and 2B illustrates an exemplary method 200. FIG. 2A illustrates the steps of the first part of an exemplary method 200 in accordance with one embodiment of the present invention. FIG. 2B illustrates the steps of the second part of an exemplary method 200 in accordance with one embodiment of the present invention.

For explanatory purposes the exemplary method 200 will be explained in connection with the exemplary CBRS network system 100 illustrated in FIG. 1 although it should be understand that the method may be implemented using other systems and other system configurations then those illustrated in FIG. 1.

The method 200 shown in FIG. 2 will now be discussed in detail. The method starts in start step 201 shown on FIG. 2A with the devices in system 100 being initialized and becoming operational. Over the air communications links or channels are established between UE 1 110, UE 2 112, UE 3 114, UE 4 116, and UE 5 118 over which packets of data are transmitted from the CBSD 1 102 to the UE devices in the cell 108. Over the air communications links or channels are established between UE 6 120, UE 7 122, UE 8 124, and UE 9 126 over which packets of data are transmitted from the CBSD 2 104 to the UE devices in the cell 109. Operation proceeds from start step 201 to steps 202, 228, . . . where processing proceeds in parallel. While two processing loops or legs of the method 200 which may be executed in parallel have been shown to explain the method the " . . . " 203 indicates that additional processing legs having the same or similar steps may be included. In the exemplary method 200 each loop or leg corresponds to the method of estimating the CBRS network cell coverage of a different CBSD device in the system and the resources, e.g., frequency bandwidth or transmission power allocation to be allocated to the CBSD device. The exemplary system 100 has previously explained includes two CBSD devices, CBSD 1 102 and CBSD 2 104, but the system can be expanded to include includes CBSD devices and UEs.

In step 202, an SAS, e.g., SAS 1 106 of system 100 is operated to set a first match counter to zero. Operation proceeds from step 202 to step 204.

In step 204, the SAS, e.g., SAS 1 106, is operated to receive user equipment (UE) information including timing advance and/or power headroom information from a first Citizen Broadband Radio Service Device (CBSD). In the example of system 100, the first CBSD is CBSD 1 102. Operation proceeds from step 204 to step 206.

In step 206, the SAS, e.g., SAS 1 106, is operated to identify a user equipment device in communication with the first CBSD, (e.g., CBSD 1 102) with the largest timing advance. The first CBSD is in communication with a user equipment device when for example the first CBSD receives control signals and/or pilot signals from the user equipment device. That is the first CBSD could be but does not have to be in data communications with the user equipment device to be in communication with the user equipment device. The identification of the user equipment device with the largest timing advance in communication with the first CBSD may be, and in some embodiments is, determined based on the user equipment information provided by the first CBSD to the SAS 1 106 device which includes the timing advance and/or power headroom information. In the example of system 100, UE 1 110, UE 2 112, UE 3 114, UE 4 116 and UE 5 118 are all in communication with the first CBSD 1 102. In the example illustrated in FIG. 3A, UE 1 110 which is the UE which is located the furthest from the CBSD 1 102 has the largest timing advance and the lowest power headroom. In the example illustrated in FIG. 3C, UE 1 110 which is the UE which is located the furthest from the CBSD 1 102 has the 2nd largest timing advance and the lowest power headroom value while UE 2 112 has the highest timing advance and the 2nd lowest power headroom value. Operation proceeds from step 206 to decision step 208.

In decision step 208, the SAS, e.g., SAS 1 106, is operated to determine if the user equipment device identified as having the largest timing advance in step 206 has the lowest power headroom of the UE devices in communication with first CBSD, e.g., CBSD 1 102. If the UE identified as having the largest timing advance does have the lowest power headroom then operation proceeds from decision step 208 to step 220. If the UE identified as having the largest timing advance does not have the lowest power headroom then operation proceeds from step 208 to step 210. The decision made in step 208 may be, and typically is, based upon the UE information received by the SAS from the first CBSD in step 204. In the example of system 100, the UE 1 110, UE 2 112, UE 3 114, UE 4 116 and UE 5 118 are in communication with the first CBSD, e.g., CBSD 1 102. In the example illustrated in FIG. 3A, UE 1 110 which is the UE which is located the furthest from the CBSD 1 102 has the largest timing advance and the lowest power headroom. In the example illustrated in FIG. 3C, UE 1 110 which is the UE which is located the furthest from the CBSD 1 102 has the 2nd largest timing advance and the lowest power headroom value while UE 2 112 has the highest timing advance and the 2nd lowest power headroom value.

In step 220, the SAS, e.g., SAS 1 106, is operated to estimate the coverage range of the first CBSD based on the timing advance and/or power headroom of the UE identified as having the largest timing advance and which also has the lowest power headroom from the UE devices in communications with the first CBSD, e.g., CBSD 1 102. Operation proceeds from step 220 to step 222.

In step 222, the SAS, e.g., SAS 1 106 is operated to update the cell coverage area for the first CBSD, e.g., CBSD 1 102, based on the timing advance and/or power headroom of the UE with the largest timing advance and lowest power headroom. Operation proceeds from step 222 to step 224.

As previously explained when in decision step 208, the UE with the largest timing advance does not have the lowest power headroom of the UEs in communications with the first CBSD then proceeds to step 210. In step 210, the SAS increments first match counter by 1. Operation proceeds from step 210 to decision step 212.

In decision step 212, the SAS (e.g., SAS 1 106) is operated to determine whether the first match counter has reached a retry limit. If the SAS determines that the first match counter has reached a retry limit then operation proceeds to step 214 from decision step 212. If the SAS determines that the first match counter has not reached a reached a retry limit then operation proceeds from decision step 212 back to step 204 where the method continues with the SAS receives user equipment information including timing advance and/or power headroom information from the first CBSD (e.g., CBSD 1 102) and the processing proceeds as previously described.

In step 214, the SAS, e.g., SAS 1 106, is operated to process the received UE information corresponding to the first CBSD to determine timing advance and/or power headroom to be used in determining the first CBSD coverage estimation. The processing of step 214 in some, but not necessarily all, embodiments includes statistical analysis and/or filtering out the outlier UE timing advance and power headroom values when determining the timing advance and power headroom values to be used in estimating the first CBSD's CBRS coverage area.

In some embodiments, in response to determining the UE in communication with the first CBSD having the largest timing advance does not also have the lowest power headroom, the SAS processes the UE information received from the first CBSD corresponding to multiple UEs to determine at least one of a timing advance or power headroom value to be used in determining the coverage area of the first CBSD. In some such embodiments, the processing includes performing at least one of determining an average TA for UEs using the first CBSD or determining an average power headroom for UEs in communication with the first CBSD. In some embodiments the TAs of UEs in communication with the first CBSD having a TA within a determined range of the average TA are used in determining the coverage area of the first CBSD (e.g., based on the standard deviation of the TA values of UEs using the first CBSD). In some embodiment the power headroom values of UEs in communication with the first CBSD that have a power headroom within a determined range of the average power headroom, and which also have a TA within the determined range of the average TA, are used in determining the coverage area of the first CBSD (e.g., based on the standard deviation of the power headroom values of UEs using the first CBSD). Operation proceeds step 214 to step 215.

In step 215, the SAS is operated to estimate the coverage area of the first CBSD based on the determined timing advance and/or power headroom. Operation proceeds from step 215 to step 216.

In step 216, the SAS, e.g., SAS 1 106, is operated to update cell coverage area for the first CBSD based on the determined timing advance and/or powerhead room. Operation proceeds from step 216 to step 218.

In step 218, the SAS, e.g., SAS 1 106, is operated to reset the first match counter to zero. Operation proceeds from step 218 to step 224.

In step 224, the SAS, e.g., SAS 1 106, is operated to allocate resources to the first CBSD, e.g., determine the frequency bandwidth and/or the transmission power allocation for the first CBSD (e.g., CBSD 1 102), based on the estimated first CBSD coverage area and estimated coverage area of one or more other Citizen Broadband Radio Service Devices, e.g., CBSD 2 104 of system 100. Operation proceeds from step 224 to step 226.

In step 226, the SAS, e.g., SAS 1 106, is operated to communicate the determined allocated resources, e.g., frequency bandwidth and/or transmission power allocations to Citizen Broadband Radio Service Devices, e.g., the first CBSD (CBSD 1 102) for which allocations have been determined. In some embodiments, multiple CBSD device allocations are made in step 224 such as for example allocations for both CBSD 1 102 and CBSD 2 104 of system 100 and then in step 226 the CBSD 1 102 and CBSD 2 104 allocations are respectively communicated to CBSD 1 102 and CBSD 2 104. Operation proceeds from step 226 to step 202 where the SAS, e.g., SAS 1 106, sets the first match counter to zero and the method continues as previously described.

The second leg or loop of the method 200 which corresponds to the estimation of the CBRS network cell coverage for a second CBSD in the network will now be discussed.

In step 228, a SAS managing the allocation of resources to a second CBSD sets a second match counter to zero. In the example of system 100, the second CBSD is CBSD 2 104 and the SAS managing the allocation of resources to a second CBSD is the same SAS as is managing the allocation of resources to the first CBSD that is SAS 1 106. Operation proceeds from step 228 to step 230.

In step 230, the SAS, e.g., SAS 1 106, receives user equipment device (UE) information including timing advance and/or power headroom information from a second Citizen Broadband Radio Service Device, e.g., CBSD 2 104. Operation proceeds from step 230 via connection node 232 to step 234 shown on FIG. 2B.

In step 234, the SAS, e.g., SAS 1 106, is operated to identify a user equipment device in communication with the second CBSD, (e.g., CBSD 2 104) with the largest timing advance. The second CBSD similar to the first CBSD is in communication with a user equipment device when for example the second CBSD receives control signals and/or pilot signals from the user equipment device. That is the second CBSD could be but does not have to be in data communications with the user equipment device to be in communication with the user equipment device. The identification of the user equipment device with the largest timing advance in communication with the first CBSD may be, and in some embodiments is, determined based on the user equipment information provided by the second CBSD to the SAS, e.g., SAS 1 106 device, which includes the timing advance and/or power headroom information. In the example of system 100, UE 6 120, UE 7 122, UE 8 124, and UE 9 126 are all in communication with the second CBSD 2 104. In the example of FIG. 12, UE 6 120 which is the UE which is located the furthest from the CBSD 2 104 has the largest timing advance value which 58 (table 1200, row 1210, column 1202). Operation proceeds from step 234 to decision step 236.

In decision step 236, the SAS, e.g., SAS 1 106, is operated to determine if the user equipment device identified as having the largest timing advance in step 234 has the lowest power headroom of the UE devices in communication with second CBSD, e.g., CBSD 2 104. If the UE identified as having the largest timing advance does have the lowest power headroom then operation proceeds from decision step 236 to step 248. If the UE identified as having the largest timing advance does not have the lowest power headroom then operation proceeds from step 236 to step 238. The decision made in step 236 may be, and typically is, based upon the UE information received by the SAS from the second CBSD in step 230. In the example of system 100, the UE 6 120, UE 7 122, UE 8 124, and UE 9 126 are in communication with the second CBSD, e.g., CBSD 2 104. In the example of FIG. 12, table 1200 shows UE 6 120 is not only the UE in communication with CBSD 2 having the highest TA value but it is also the UE with the lowest powerhead room value which is 0 (table 1200, row 1210, column 1206).

In step 248, the SAS, e.g., SAS 1 106, is operated to estimate the coverage range of the second CBSD based on the timing advance and/or power headroom of the UE identified as having the largest timing advance and which also has the lowest power headroom from the UE devices in communications with the second CBSD, e.g., CBSD 2 104. Operation proceeds from step 248 to step 250.

In step 250, the SAS, e.g., SAS 1 106 is operated to update the cell coverage area for the second CBSD, e.g., CBSD 2 104, based on the timing advance and/or power headroom of the UE with the largest timing advance and lowest power headroom. Operation proceeds from step 250 to step 252.

As previously explained when in decision step 236, the UE with the largest timing advance does not have the lowest power headroom of the UEs in communication with the second CBSD then proceeds to step 238. In step 238, the SAS increments second match counter by 1. Operation proceeds from step 238 to decision step 240.

In decision step 240, the SAS (e.g., SAS 1 106) is operated to determine whether the second match counter has reached a retry limit. If the SAS determines that the second match counter has reached a retry limit then operation proceeds to step 240 from decision step 242. If the SAS determines that the second match counter has not reached a reached a retry limit then operation proceeds from decision step 240 via connection node B back to step 236 shown on FIG. 2A where the method continues with the SAS receiving user equipment information including timing advance and/or power headroom information from the second CBSD (e.g., CBSD 2 104) and the processing proceeds as previously described.

In step 242, the SAS, e.g., SAS 1 106, is operated to process the received UE information corresponding to the second CBSD to determine timing advance and/or power headroom to be used in determining the second CBSD coverage estimation. The processing of step 242 in some, but not necessarily all, embodiments includes filtering out the outlier UE timing advance and power headroom values when determining the timing advance and power headroom values to be used in estimating the second CBSD's CBRS coverage area. Operation proceeds step 242 to step 243.

In step 243, the SAS is operated to estimate the coverage area of the second CBSD based on the determined timing advance and/or power headroom. Operation proceeds from step 243 to step 244.

In step 244, the SAS, e.g., SAS 1 106, is operated to update cell coverage area for the second CBSD based on the determined timing advance and/or power headroom. Operation proceeds from step 244 to step 246.

In step 246, the SAS, e.g., SAS 1 106, is operated to reset the second match counter to zero. Operation proceeds from step 246 to step 252.

In step 252, the SAS, e.g., SAS 1 106, is operated to allocate resources to the second CBSD, e.g., determine the frequency bandwidth and/or the transmission power allocation for the second CBSD (e.g., CBSD 2 104), based on the estimated second CBSD coverage area and estimated coverage area of one or more other Citizen Broadband Radio Service Devices, e.g., CBSD 1 102 of system 100. Operation proceeds from step 252 to step 254.

In step 254, the SAS, e.g., SAS 1 106, is operated to communicate the determined allocated resources, e.g., frequency bandwidth and/or transmission power allocations to Citizen Broadband Radio Service Devices, e.g., the second CBSD (CBSD 2 104) for which allocations have been determined. In some embodiments, multiple CBSD device allocations are made in step 252 such as for example allocations for both CBSD 2 104 and CBSD 1 102 of system 100 and then in step 254 the CBSD 2 104 and CBSD 1 102 allocations are respectively communicated to CBSD 2 104 and CBSD 1 102. Operation proceeds from step 254 to step 228 shown on FIG. 2A via connection node C where the SAS, e.g., SAS 1 106, sets the second match counter to zero and the method continues as previously described.

Additional exemplary embodiments of the present invention in which timing advance (TA) and power headroom (PH) values of user equipment devices (UEs) are utilized to estimate the coverage of a particular CBSD will now be discussed. In various embodiments, an SAS managing CBSDs in a CBRS network collects all the TA reports from all UEs. The SAS then ranks the TA values reported to a particular CBSD and ranks them from highest to lowest. The PH values from all UES for the same particular CBSD are received from the UEs, e.g., via the particular CBSD, and are ranked from lowest to highest where PH values range from 0 to 23 with a PH value of '0' meaning that there is no more uplink power left and a PH value '23' meaning that that there is full power available in uplink. The following three scenarios will now be considered.

In the first scenario, the user equipment device with the highest timing advance is also the user with the lowest power headroom. The SAS then uses the highest timing advance value and/or lowest power headroom value collected for the particular CBSD to generate an estimated CBRS network cell coverage area for the particular CBSD.

In the second scenario, the user with the highest timing advance is not the user with the lowest power headroom. In this case, the user equipment device with the highest timing advance is eliminated or removed from consideration in the process of determining an estimate of the CBRS network coverage area for the particular CBSD. In some but not all embodiments, the UE device with the lowest power headroom value is also eliminated from consideration in the process of determining an estimate of the CBRS network coverage area for the particular CBSD. The SAS after eliminating the user equipment device with the highest timing advance value and in some embodiments the user equipment device with the lowest power headroom, identifies the user equipment device with the next highest timing advance value and determines if it has the lowest power headroom value of the remaining user equipment devices. When it does then the SAS uses the identified user equipment device's timing advance value and power headroom value to generate an estimated CBRS network cell coverage area for the particular CBSD. When it does not, the SAS repeats the process until the UE device with the highest timing advance and the lowest power headroom are the same or a retry limit has been reached. If a UE device with the highest timing advance and the lowest power headroom is identified before the retry limit is reached then the SAS uses the identified user equipment device's timing advance value and power headroom value to generate an estimated CBRS network cell coverage area for the particular CBSD. When the retry limit is reached before a UE device with the highest timing advance and the lowest power headroom, the SAS generates an estimated CBRS network cell coverage area for the particular CBSD based on a statistical analysis of the UE devices timing advance and power headroom values collected for all the UEs. In some embodiments, the retry limit is set so that all possibilities are exhausted in which case at the very worst the last UE which has not been eliminated will be the UE with the highest timing advance value and the lowest power headroom value. In such a case the retry limit is just a limit to retry until there is only a single UE which has not been eliminated. In other embodiments, the retry limit value is set so a fixed number or percentage of UEs are tested and/or eliminated such as for example, 10% of the UE devices from the set of UE devices whose timing advance and power headroom values have been collected for the particular CSBD. If the SAS is unable to identify a UE with the highest timing advance and also having the lowest power headroom using the aforementioned process within the specified retry limit then the SAS uses statistical analysis of the UE timing advance and power headroom values collected for all UEs of the particular CBSD and/or all UEs for all CBSDs to determine and/or generate an estimated CBRS network cell coverage area for the particular CBSD.

In this third scenario in which the SAS uses statistical analysis the SAS creates or generates a probability distribution of all timing advance and power headroom values reported with all UEs in the network. The SAS then generates, e.g., calculates, average and standard deviation for the data sets (region 1). The SAS determines or identifies the user equipment devices residing in average+3*standard deviation for timing advance (region 2). The SAS also determines or identifies the user equipment devices residing in average−3*standard deviation for power headroom. The SAS then determines the user equipment devices which reside in, i.e. included in, the first and second regions. The SAS uses the timing advance and power headroom values from the UEs determined to reside in the first and second regions to determine and/or generate an estimated CBRS network cell coverage area for the particular CBSD. In some embodiments, the SAS uses the timing advance value and power headroom value of the UE with the lowest power headroom to then determine or generate the estimated coverage area for the particular CBSD.

Once the CBSD has estimated the coverage area for the particular CBSD regardless of the scenario, the SAS determines resource allocation, e.g., frequency bandwidth or a transmission power level, for one or more CBSDs it is managing in the CBRS network. The one or more CBSDs typically include the particular CBSD for which the estimated coverage area was determined. The SAS then communicates the determined resource allocation to the effected CBSDs.

Figure 10:
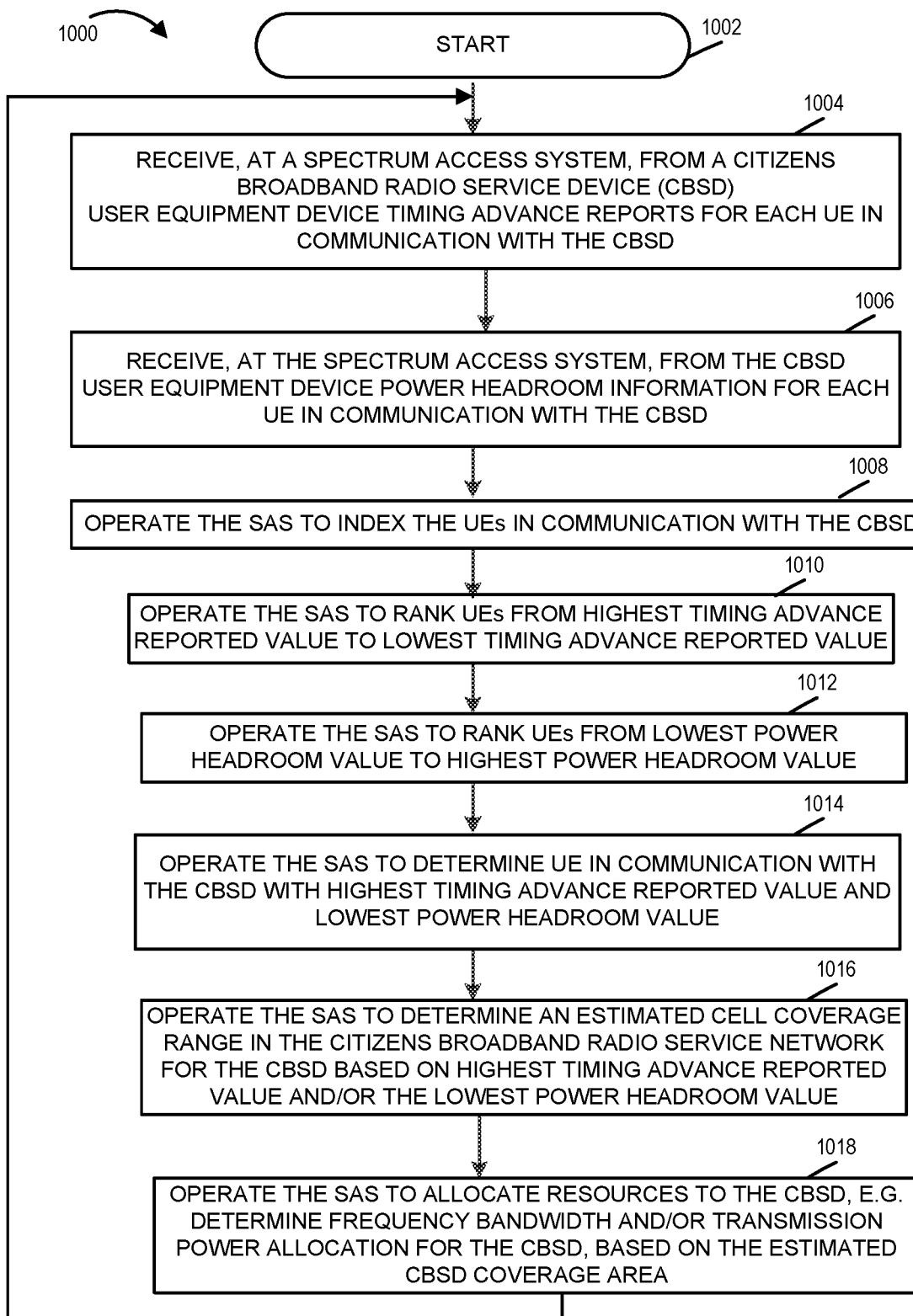
FIG. 10 illustrates another exemplary method in accordance with an embodiment of the present invention.

FIG. 10 which illustrates the steps of a flowchart of a method 1000 illustrates another exemplary method embodiment for determining the estimated coverage area of a CBSD managed by an SAS and determining and allocating resources based on the estimated coverage area of the CBSD. The method 1000 illustrates a method directed to the first scenario discussed above.

For explanatory purposes the exemplary method 1000 will be explained in connection with the exemplary communications system 100 illustrated in FIG. 1 although it should be understand that the method may be implemented using other systems and other system configurations then those illustrated in FIG. 1.

The method 1000 shown in FIG. 10 will now be discussed in detail. The method starts in start step 1002 shown on FIG. 10 with the devices in communications system 100 being initialized and becoming operational.

Over the air communications links or channels are established between user equipment devices (UEs) UE 1 110, UE 2 112, UE 3 114, UE 4 116, and UE 5 118 over which packets of data are transmitted from the CBSD 1 102 to the UE devices in the cell 108. Over the air communications links or channels are established between UE 6 120, UE 7 122, UE 8 124, and UE 9 126 over which packets of data are transmitted from the CBSD 2 104 to the UE devices in the cell 109. Operation proceeds from start step 1002 to step 1004. In step 1004, a Spectrum Access System (SAS), e.g., SAS 1 106 of system 100, is operated to receive from a Citizens Broadband Radio Service Device (CBSD), e.g., CBSD 1 102, user equipment device timing advance reports for each user equipment device in communication with the CBSD, e.g., CBSD 1 102. The CBSD generates the timing advance values for each UE device based on timing of measurements of signals received from each of the UE devices. The UE devices are wireless terminals. Operation proceeds from step 1004 to step 1006.

In step 1006, the SAS, e.g., SAS 1 106, is operated to receive from the CBSD user equipment device power headroom information for each user equipment device in communication with the CBSD, e.g., CBSD 1 102. Operation proceeds from step 1006 to step 1008.

In step 1008, the SAS, SAS 1 106, is operated to index the UEs (e.g., assign a number to each UE) in communication with the CBSD, e.g., CBSD 1 102. For example, in connection with system 100, UE 1 receives index number 1, UE 2 receives index number 2, UE 3 receives index number 3, UE 4 receives index number 4 and UE 5 receives index number 5. Operation proceeds from step 1008 to step 1010.

In step 1010, the SAS, e.g., SAS 1 106, is operated to rank UEs from highest timing advance reported value to lowest timing advance reported value. Operation proceeds from step 1010 to step 1012.

In step 1012, the SAS, e.g., SAS 1 106, is operated to rank UEs from lowest power headroom value to highest power headroom value. Operation proceeds from step 1012 to step 1014.

In step 1014, the SAS, e.g., SAS 1 106, is operated to determine the user equipment device in communication with the CBSD with the highest timing advance reported value and lowest power headroom value. Operation proceeds from step 1014 to step 1016.

In step 1016, the SAS is operated to determine an estimated cell coverage range in the Citizens Broadband Radio Service Network for the CBSD based on the highest advance reported value and/or the lowest power headroom value of the user equipment device in communication with the CBSD, e.g., CBSD 1 102, determined to have the highest timing advance reported value and lowest power headroom value. Operation proceeds from step 1016 to step 1018.

In step 1018, the SAS, e.g., SAS 1 106 is operated to allocate resources to the CBSD, e.g., CBSD 1 102, e.g., the SAS determines frequency bandwidth and/or transmission power allocations for the CBSD, e.g., CBSD 1 102, based on the estimated CBSD coverage area. The SAS may also determine resource allocations based on the estimated CBSD coverage area for other CBSDs it is managing in the CBRS nework such as for example in system 100, the SAS 1 106 may also determine resource allocations for CBSD 2 104 based on the estimated CBSD coverage area for CBSD 1 102 such as increasing the CBSD 2 104 power transmission level as there is a gap between the CBSD 1 102 and CBSD 2 104 cell range coverage as shown in FIG. 1. After the SAS, e.g., SAS 1 106, makes the CBSD resource allocations it saves those allocations in memory along with the CBSDs estimated coverage range and settings. The SAS, e.g., SAS 1 106 also communicates the determined CBSD(s) resource allocations to the CBSD(s) for which resource allocations have been made.

Operation proceeds from step 1018 back to step 1004 wherein the steps of the method are repeated. In some embodiments, the SAS performs the steps of the method 1000 on a periodic basis to update the estimate of the CBSD coverage area and resource allocation. In some embodiments, the SAS performs the steps of the method whenever there is a change in the allocation of the frequency bandwidth or power transmission allocation to the CBSD or a neighboring CBSD. In some embodiments, the SAS performs the steps of the method on an on-going basis and only stores the determined CBSD estimated coverage area if the estimated coverage area increases for the CBSD for the CBSD's current configuration, e.g., same allocated frequency band and/or power transmission level. In such cases, the SAS will determine and maintain the largest coverage area for the CBSD at the particular configuration. In some embodiments, the SAS will skip or bypass the step of allocating resources for the CBSD if the change in the estimated CBSD coverage range is not increased but decreases or is not increased by an amount over a predetermined threshold.

Figure 11A:
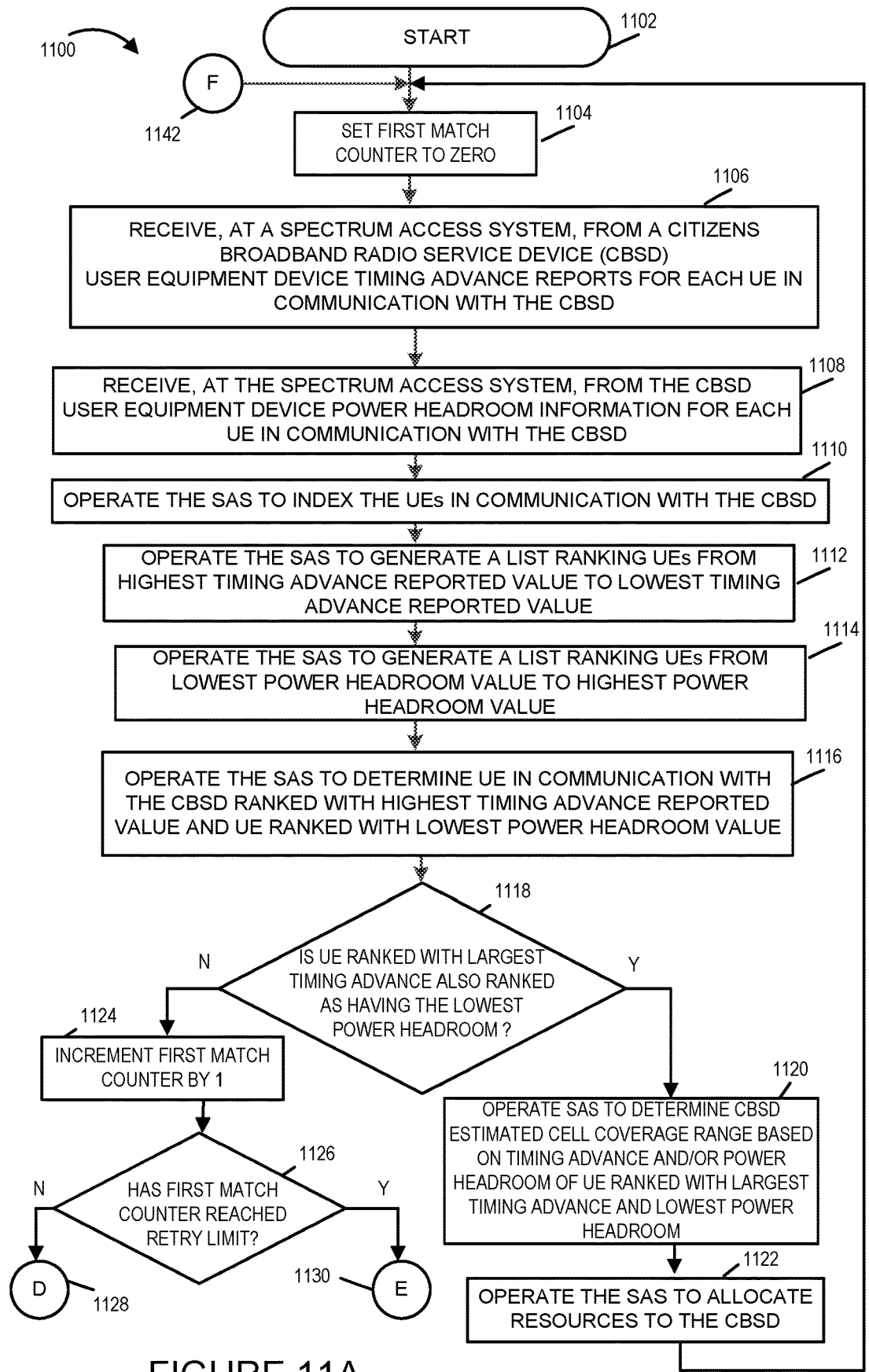
FIG. 11A illustrates the steps of the first part of an exemplary method in accordance with one embodiment of the present invention.
Figure 11C:
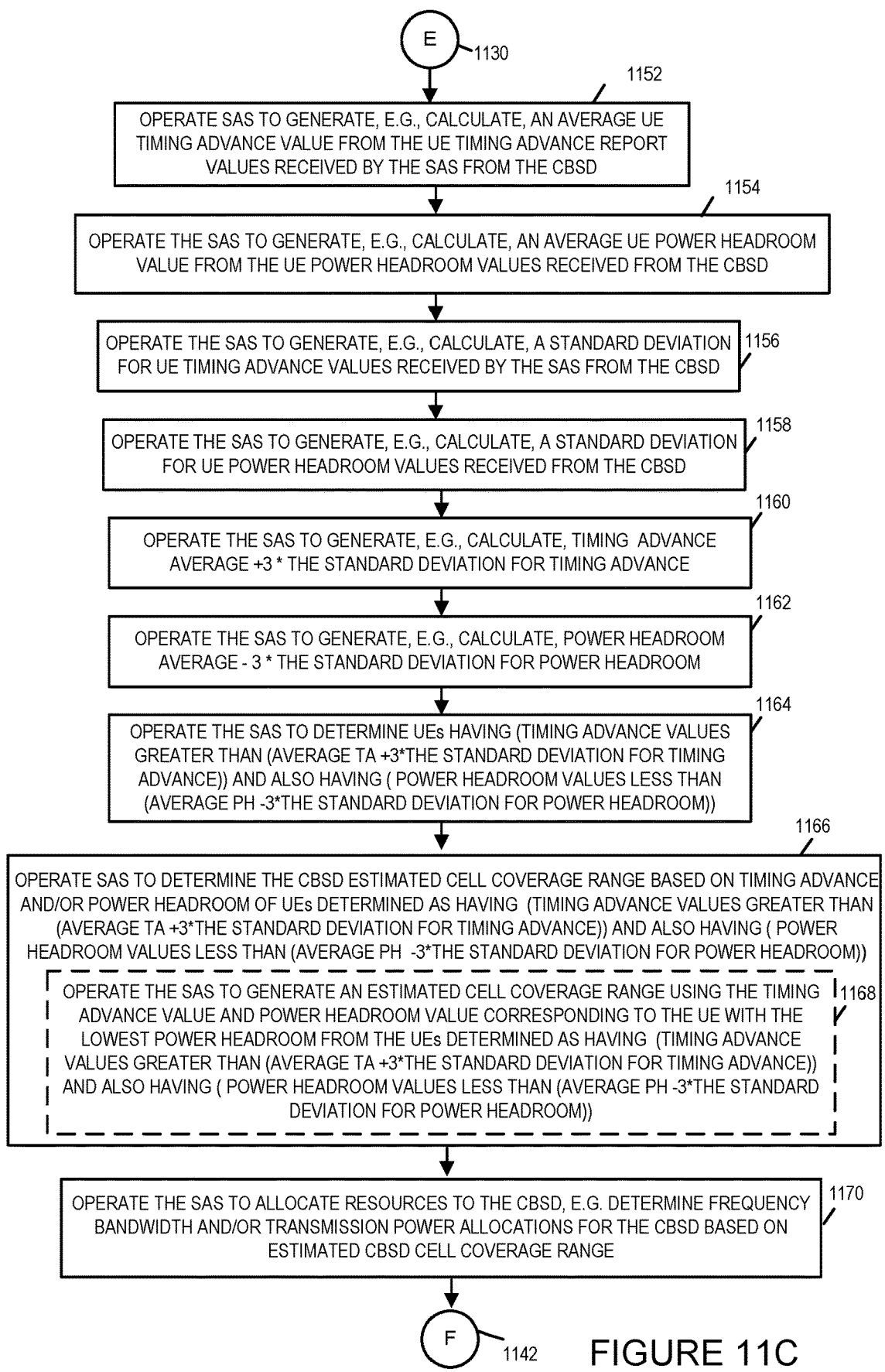
FIG. 11C illustrates the steps of the third part of an exemplary method in accordance with one embodiment of the present invention.

FIG. 11, which comprises the combination of FIGS. 11A, 11B, and illustrates another exemplary embodiment of the present invention. It illustrates a method 1100 of estimating a CBSD's CBRS network cell coverage range and allocating resources e.g., bandwidth frequency and transmission power allocations, in a CBRS network. FIG. 11A illustrates the steps of the first part of an exemplary method 1100 in accordance with one embodiment of the present invention. FIG. 11B illustrates the steps of the second part of an exemplary method 1100 in accordance with one embodiment of the present invention. FIG. 11C illustrates the steps of the third part of an exemplary method 1100 in accordance with one embodiment of the present invention. The method 1100 illustrated in FIG. 11 illustrates the steps of a method that address not only scenario 1 discussed above but also scenario two and three discussed above.

For explanatory purposes the exemplary method 1100 will be explained in connection with the exemplary communications system 100 illustrated in FIG. 1 although it should be understand that the method may be implemented using other systems and other system configurations then those illustrated in FIG. 1.

The method 1100 shown in FIG. 11 will now be discussed in detail. The method starts in start step 1102 shown on FIG. 11A with the devices in communications system 100 being initialized and becoming operational.

Over the air communications links or channels are established between UE 1 110, UE 2 112, UE 3 114, UE 4 116, and UE 5 118 over which packets of data are transmitted from the CBSD 1 102 to the UE devices in the cell 108. Over the air communications links or channels are established between UE 6 120, UE 7 122, UE 8 124, and UE 9 126 over which packets of data are transmitted from the CBSD 2 104 to the UE devices in the cell 109. Operation proceeds from start step 1102 to step 1104.

In step 1104, a Spectrum Access System, e.g., SAS 1 106 of system 100, sets a first match counter to zero. Operation proceeds from step 1104 to step 1106.

In step 1106, the SAS receives from a Citizens Broadband Radio Service Device (CBSD) user equipment device timing advance reports for each UE in communication with the CBSD, e.g., CBSD 1 102. Operation proceeds from step 1106 to step 1108.

In step 1108, the SAS receives from the CBSD user equipment device power headroom information for each UE in communication with the CBSD, e.g., CBSD 1 102. Operation proceeds from step 1108 to step 1110.

In step 1110, the SAS is operated to index the UEs in communication with the CBSD for example by assigning them index numbers. Operation proceeds from step 1110 to step 1112.

In step 1112, the SAS is operated to generate a list ranking UEs from highest timing advance reported value to lowest timing advance reported value. Operation proceeds from step 1112 to step 1114.

In step 1114, the SAS is operated to generate a list ranking UEs from lowest power headroom value to highest power headroom value. Operation proceeds from step 1114 to step 1116.

In step 1116, the SAS is operated to determine the UE in communication with the CBSD with the highest timing advance reported value and UE in communication with the CBSD with ranking with the lowest power headroom value. Operation proceeds from step 1116 to step 1118.

In decision step 1118, the SAS is operated to determine or decide if the UE ranked as having the largest timing advance value is also the UE ranked as having the lowest power headroom value. When the SAS determines or decides that the UE ranked with the largest timing advance value is the UE ranked with the lowest power headroom value operation proceeds from step 1118 to step 1120. When the SAS determines or decides that the UE ranked with the largest timing advance value is not the UE ranked with the lowest power headroom value operation proceeds from step 1118 to step 1124.

In step 1120, the SAS is operated to determine an CBSD estimated cell coverage range based on the timing advance value and/or power headroom value of UE ranked with the largest timing advance and lowest power headroom value. Operation proceeds from step 1120 to step 1122.

In step 1122, the SAS is operated to allocate resources, e.g., determine frequency bandwidth and/or transmission power allocations, to the CBSD, e.g., CBSD 1 102, and in some embodiments one or more other CBSDs such as for example, CBSD 2 104. Operation proceeds from step 1122 to step 1104 where the steps of the method are repeated for the same or different CBSDs under the control and/or management of the SAS.

In step 1124, the SAS is operated to increment the first match counter by 1. Operation proceeds from step 1124 to step 1126.

In decision step 1126, the SAS decides or determines whether the first match counter has reached a retry limit. The retry limit is a configurable number that determines the number of attempts that SAS will attempt to identify with the highest timing advance value and the lowest power headroom value after eliminating UEs that do not meet the criteria. As previously explained in connection with method 1000, the different retry limits may be utilized such as for the retry limit may be a number that is a percentage of the total number of UEs for which the SAS has received data from the CBSD such as 10%. When the SAS determines or decides that the first match counter has not reached the retry limit operation proceeds from step 1126 via connection node D 1128 to step 1132 shown on FIG. 11B. When the SAS determines or decides that the first match counter has reached the retry limit then operation proceeds from step 1126 via connection node E 1130 to step 1152 shown on FIG. 11C.

In step 1132, the SAS operated to remove or eliminate the UE with the largest timing advance value from the list of UEs ranked by timing advance values to generate a revised list of UEs ranked by timing advance values. Operation proceeds from step 1132 to step 1134.

In step 1134, the SAS is operated to remove or eliminate the UE with the largest timing advance value from the list of UEs ranked by power headroom to generate a revised list of UEs ranked by power headroom values. Operation proceeds from step 1134 to step 1136.

In some embodiments, the UE with the lowest powerhead value is also removed or eliminated from the list of UEs ranked by timing advance values and the list of UEs ranked by power headroom values.

In step 1136, the SAS is operated to decide or determine if the UE in the revised timing advanced list having the largest or highest timing advance value is also the UE in the revised power headroom list having the lowest power headroom value. When the SAS decides or determines that the UE in the revised UE timing advance list having the largest or highest timing advance value is also the UE in the revised UE power headroom list having the lowest power headroom value then operation proceeds from step 1136 to step 1138. When the SAS decides or determines that the UE in the revised UE timing advance list having the largest or highest timing advance value is not also the UE in the revised UE power headroom list having the lowest power headroom value then operation proceeds from step 1136 to step 1144.

In step 1138, the SAS is operated to determine a CBSD estimated cell coverage range based on timing advance and/or power headroom values of the UE ranked with largest timing advance value and lowest power headroom value in the revised UE timing advanced list and revised UE power headroom list. Operation proceeds from step 1138 to step 1140.

In step 1140, the SAS is operated to allocate resources, e.g., determine frequency bandwidth and/or transmission power allocations, to the CBSD, e.g., CBSD 1 102, and in some embodiments one or more other CBSDs such as for example, CBSD 2 104. Operation proceeds from step 1140 to step 1104 shown on FIG. 11A via connection node F 1142 where the steps where processing continues and the steps of the method are repeated for the same CBSD or a different CBSD under the control or management of the SAS.

In step 1144, the SAS is operated to increment the first match counter by 1. Operation proceeds from step 1144 to step 1146.

In decision step 1146, the SAS decides or determines whether the first match counter has reached the retry limit. When the SAS determines or decides that the first match counter has not reached the retry limit operation proceeds from step 1146 to step 1148. When the SAS determines or decides that the first match counter has reached the retry limit then operation proceeds from step 1146 via connection node E 1130 to step 1152 shown on FIG. 11C.

In step 1148, the SAS is operated to remove or eliminate the UE with the largest or highest timing advance value from the revised list of UEs ranked by timing advance. Operation proceeds from step 1148 to step 1150.

In step 1150, the SAS is operated to remove or eliminate the UE with the largest or highest timing advance from the revised list of UEs ranked by timing advance. Operation proceeds from step 1150 back to decision step 1136 wherein processing continues as previously discussed.

In some embodiments, the UE with the lowest powerhead value is also removed or eliminated from the list of UEs ranked by timing advance values and the list of UEs ranked by power headroom values.

When the retry limit has been reached processing proceeds from step 1146 to step 1152 shown on FIG. 11C via connection node E as previously described. Steps 1152 to step 1166 are processing steps to perform statistical analysis that is used to determine an estimated coverage area for the CBSD.

In step 1152, the SAS is operated to generate, e.g., calculate, an average UE timing advance value from the UE timing advance report values received by the SAS from the CBSD. In some embodiments, the UE timing advance report values provided to the SAS from other CBSDs are also utilized to generate the average UE timing advance value. Operation proceeds from step 1152 to step 1154.

In step 1154, the SAS is operated to generate, e.g., calculate, an average UE power headroom value from the UE power headroom values received by the SAS from the CBSD. In some embodiments, the UE power headroom values provided to the SAS from other CBSDs are also utilized to generate the average UE power headroom value. Operation proceeds from step 1154 to step 1156.

In step 1156, the SAS is operated to generate, e.g., calculate, a standard deviation for UE timing advance values received by the SAS from the CBSD. In embodiments in which the UE timing advance values for other CBSDs was also utilized to generate the average UE timing advance value the standard deviation is for all UE timing advance values used to generate the UE average timing advance value. Operation proceeds from step 1156 to step 1158.

In step 1158, the SAS is operated to generate, e.g., calculate, a standard deviation for UE power headroom values received by the SAS from the CBSD. In embodiments in which the UE power headroom values for other CBSDs was also utilized to generate the average UE power headroom value the standard deviation is for all UE power headroom values used to generate the UE average power headroom value. Operation proceeds from step 1158 to step 1160.

In step 1160, the SAS is operated to generate, e.g., calculate, the generated average timing advance+3*the standard deviation for timing advance. Operation proceeds from step 1160 to step 1162.

In step 1162, the SAS is operated to generate, e.g., calculate, the generated average power headroom−3*the standard deviation for power headroom. Operation proceeds from step 1162 to step 1164.

In step 1164, the SAS is operated to determine UEs in communication with the CBSD, e.g., CBSD 1 102, having (timing advance values greater than (average timing advance value+3*the standard deviation for timing advance)) and also having (power headroom values less than (average power headroom−3*the standard deviation for power headroom)). Operation proceeds from step 1164 to step 1166.

In step 1166, the SAS is operated to determine the CBSD, e.g., CBSD 1 102, estimated cell coverage range based on timing advance and/or power headroom of UEs determined as having (timing advance values greater than (average TA value+3*the standard deviation for timing advance)) and also having (power headroom values less than (power headroom average value−3*the standard deviation for power headroom)). In some embodiment, step 1166 includes sub-step 1168. In sub-step 1168, the SAS is operated to generate an estimated cell coverage range for the CBSD using the timing advance value and power headroom value corresponding to the UE with the lowest power headroom value from the UEs determined as having (timing advance values greater than (average TA+3*the standard deviation for timing advance)) and also having (power headroom values less than (average power headroom−3*the standard deviation for power headroom)). In alternative embodiment, the SAS is operated to generate an estimated cell coverage range for the CBSD using the timing advance value and power headroom value corresponding to the UE with the highest or largest timing advance value from the UEs determined as having (timing advance values greater than (average TA+3*the standard deviation for timing advance)) and also having (power headroom values less than (average power headroom−3*the standard deviation for power headroom)). In some embodiments, the subset of UEs that have been identified are once again ranked by timing advance and power headroom values and the previously described steps of the process of trying to determine a UE ranked as having a highest or largest timing advance and also being ranked as having the lowest power headroom is attempted with the reduced subset. Operation proceeds from step 1166 to step 1170.

In step 1170, the SAS is operated to allocate resources, e.g., determine frequency bandwidth and/or transmission power allocations, to the CBSD, e.g., CBSD 1 102, and in some embodiments one or more other CBSDs such as for example, CBSD 2 104. Operation proceeds from step 1130 to step 1104 shown on FIG. 11A via connection node F 1142 where the steps of the method are repeated for the same or different CBSDs under the control and/or management of the SAS.

As described above in connection with the method 1000 and is also applicable to some embodiments of the method 200, the SAS may also in connection with method 1100 determine resource allocations based on the estimated CBSD coverage area for other CBSDs it is managing in the CBRS nework such as for example in system 100, the SAS 1 106 may also determine resource allocations for CBSD 2 104 based on the estimated CBSD coverage area for CBSD 1 102 such as increasing the CBSD 2 104 power transmission level as there is a gap between the CBSD 1 102 and CBSD 2 104 cell range coverage as shown in FIG. 1. After the SAS, e.g., SAS 1 106, makes the CBSD resource allocations it saves those allocations in memory along with the CBSDs estimated coverage range and settings. The SAS, e.g., SAS 1 106 also communicates the determined CBSD(s) resource allocations to the CBSD(s) for which resource allocations have been made.

In some embodiments of the methods 200 and 1100, the SAS performs the steps of the methods 200 or 1100 on a periodic basis to update the estimate of the CBSD coverage area and resource allocation. In some embodiments, the SAS performs the steps of the method whenever there is a change in the allocation of the frequency bandwidth or power transmission allocation to the CBSD or a neighboring CBSD. In some embodiments, the SAS performs the steps of the method on an on-going basis and only stores the determined CBSD estimated coverage area if the estimated coverage area increases for the CBSD for the CBSD's current configuration, e.g., same allocated frequency band and/or power transmission level. In such cases, the SAS will determine and maintain the largest coverage area for the CBSD at the particular configuration. In some embodiments, the SAS will skip or bypass the step of allocating resources for the CBSD if the change in the estimated CBSD coverage range is not increased but decreases or is not increased by an amount over a predetermined threshold.

In various embodiments of the invention, the CBSDs of the system obtain and rank the UE power headroom values of UEs in communication with the CBSD and provide the ranked UE power headroom values to the SAS which is managing the CBSD. In some embodiments, the CBSDs generate timing advance value reports for the UEs in communication with the CBSD and rank the UE timing advance values and then provide the ranked UE timing advance values to the SAS which is managing the CBSD.

LIST OF SET OF EXEMPLARY NUMBERED EMBODIMENTS

Method Embodiment 1

A method of operating a Spectrum Access System (SAS), the method comprising: receiving, from a first Citizens Broadband Radio Service Device (CBSD), first user equipment (UE) information including at least one of timing advance or power headroom information for one or more UEs in communication with said first CBSD; estimating, based on the received first UE information, a first CBSD coverage area; and making a first resource allocation to the first CBSD based on the estimated first CBSD coverage area, said first resource allocation including an allocation of at least one of a frequency bandwidth allocation or transmission power allocation to the first CBSD.

Method Embodiment 2

The method of method embodiment 1, further comprising: prior to estimating the first CBSD coverage area, identifying the UE with the largest timing advance in communication with the first CBSD; and determining if the UE in communication with the first CBSD having the largest timing advance also has the lowest power headroom of the UEs for which power headroom information is provided in said first UE information.

Method Embodiment 3

The method of method embodiment 2, wherein estimating, based on the received first UE information, the first CBSD coverage area includes, when the first CBSD having the largest timing advance also has the lowest power headroom of the UEs for which power headroom information is provided, using the timing advance of the UE with the largest timing advance to estimate the first CBSD coverage area.

Method Embodiment 4

The method of method embodiment 3, wherein estimating, based on the received first UE information, the first CBSD coverage area includes, when the first CBSD having the largest timing advance also has the lowest power headroom of the UEs for which power headroom information is provided, taking into consideration the lowest power headroom information, in addition to the largest timing advance, when determining the first CBSD coverage area (e.g., if there is remaining power headroom that can be taken into consideration to determine that the coverage area of the first CBSD is larger than what would be indicated by simply the largest timing advance was used).

Method Embodiment 5

The method of method embodiment 2, further comprising: in response to determining the UE in communication with the first CBSD having the largest timing advance does not also have the lowest power headroom, processing the UE information received from the first CBSD corresponding to multiple UEs to determine at least one of a timing advance or power headroom value to be used in determining the coverage area of the first CBSD.

Method Embodiment 6

The method of method embodiment 5, wherein processing the UE information received from the first CBSD corresponding to multiple UEs to determine at least one of a timing advance or power headroom value to be used in determining the coverage area of the first CBSD includes performing at least one of determining an average TA for UEs using the first CBSD or determining an average power headroom for UEs in communication with the first CBSD.

Method Embodiment 7

The method of method embodiment 6, wherein TAs of UEs in communication with the first CBSD having a TA within a determined range of the average TA are used in determining the coverage area of the first CBSD (e.g., based on the standard deviation of the TA values of UEs using the first CBSD).

Method Embodiment 8

The method of method embodiment 7, wherein power headroom values of UEs in communication with the first CBSD that have a power headroom within a determined range of the average power headroom, and which also have a TA within the determined range of the average TA, are used in determining the coverage area of the first CBSD (e.g., based on the standard deviation of the power headroom values of UEs using the first CBSD).

Method Embodiment 9

The method of method embodiment 1, further comprising: receiving, from a second CBSD, second user equipment (UE) information including at least one of timing advance or power headroom information for one or more UEs in communication with said second CBSD; estimating, based on the received second UE information, a second CBSD coverage area; and make a second resource allocation to the second CBSD based on the estimated first CBSD coverage area and the estimated second CBSD coverage area, said second resource allocation including an allocation of at least one of a frequency allocation or power allocation to the first CBSD.

System Embodiment 10

A Spectrum Access System (SAS) comprising: memory; an input/output interface including at least one receiver and at least one transmitter; one or more processors that control the SAS to: receive, from a first Citizens Broadband Radio Service Device CBSD, first user equipment (UE) information including at least one of timing advance or power headroom information for one or more UEs in communication with said first CBSD; estimate, based on the received first UE information, a first CBSD coverage area; and make a first resource allocation to the first CBSD based on the estimated first CBSD coverage area, said first resource allocation including an allocation of at least one of a frequency bandwidth allocation or transmission power allocation to the first CBSD.

System Embodiment 11

The Spectrum Access System of system embodiment 10, wherein said one or more processors control the SAS to: prior to estimating the first CBSD coverage area, identify the UE with the largest timing advance in communication with the first CBSD; and determine if the UE in communication with the first CBSD having the largest timing advance also has the lowest power headroom of the UEs for which power headroom information is provided in said first UE information.

System Embodiment 12

The Spectrum Access System of system embodiment 11, wherein said to estimate, based on the received first UE information, the first CBSD coverage area includes, when the first CBSD having the largest timing advance also has the lowest power headroom of the UEs for which power headroom information is provided, using the timing advance of the UE with the largest timing advance to estimate the first CBSD coverage area.

System Embodiment 13

The Spectrum Access System of system embodiment 12, wherein said to estimate, based on the received first UE information, the first CBSD coverage area includes, when the first CBSD having the largest timing advance also has the lowest power headroom of the UEs for which power headroom information is provided, taking into consideration the lowest power headroom information, in addition to the largest timing advance, when determining the first CBSD coverage area (e.g., if there is remaining power headroom that can be taken into consideration to determine that the coverage area of the first CBSD is larger than what would be indicated by simply the largest timing advance was used).

System Embodiment 14

The Spectrum Access System of system embodiment 11, wherein said one or more processors control the SAS to process the UE information received from the first CBSD corresponding to multiple UEs to determine at least one of a timing advance or power headroom value to be used in determining the coverage area of the first CBSD in response to determining the UE in communications with the CBSD having the largest timing advance does not also have the lowest power headroom.

System Embodiment 15

The Spectrum Access System of system embodiment 14, wherein said processing the UE information received from the first CBSD corresponding to multiple UEs to determine at least one of a timing advance or power headroom value to be used in determining the coverage area of the first CBSD includes performing at least one of determining an average TA for UEs in communication with the first CBSD or determining an average power headroom for UEs in communication with the first CBSD.

System Embodiment 16

The Spectrum Access System of system embodiment 15, wherein TAs of UEs in communication with the first CBSD having a TA within a determined range of the average TA are used in determining the coverage area of the first CBSD (e.g., based on the standard deviation of the TA values of UEs using the first CBSD).

System Embodiment 17

The Spectrum Access System of system embodiment 16, wherein power headroom values of UEs in communication with the first CBSD that have a power headroom within a determined range of the average power headroom, and which also have a TA within the determined range of the average TA, are used in determining the coverage area of the first CBSD (e.g., based on the standard deviation of the power headroom values of UEs using the first CBSD).

System Embodiment 18

The Spectrum Access System of system embodiment 10, wherein said one or more processors controls the SAS to:
receive, from a second CBSD, second user equipment (UE) information including at least one of timing advance or power headroom information for one or more UEs in communication with said second CBSD; estimate, based on the received second UE information, a second CBSD coverage area; and make a second resource allocation to the second CBSD based on the estimated first CBSD coverage area and the estimated second CBSD coverage area, said second resource allocation including an allocation of at least one of a frequency allocation or power allocation to the first CBSD.

Computer Readable Medium Embodiment 19

A non-transitory computer readable medium including a first set of computer executable instructions which when executed by a processor of a Spectrum Access System (SAS) device cause the SAS device to perform the steps of: receiving, from a first Citizens Broadband Radio Service Device (CBSD), first user equipment (UE) information including at least one of timing advance or power headroom information for one or more UEs in communication with said first CBSD; estimating, based on the received first UE information, a first CBSD coverage area; and making a first resource allocation to the first CBSD based on the estimated first CBSD coverage area, said first resource allocation including an allocation of at least one of a frequency bandwidth allocation or transmission power allocation to the first CBSD.

Computer Readable Medium Embodiment 20

The non-transitory computer readable medium of computer readable medium embodiment 19, wherein estimating, based on the received first UE information, the first CBSD coverage area includes, when the first CBSD having the largest timing advance also has the lowest power headroom of the UEs for which power headroom information is provided, using the timing advance of the UE with the largest timing advance to estimate the first CBSD coverage area.

Method Embodiment 21

The method of method embodiment 1, further comprising: communicating the resource allocation to the first CBSD.

System Embodiment 22

The Spectrum Access System of system embodiment 10, wherein said one or more processors further control the SAS to communicate the resource allocation to the first CBSD.

The techniques of various embodiments may be implemented using software, hardware and/or a combination of software and hardware. Various embodiments are directed to apparatus, e.g., CBSD, user equipment devices, SAS, Serving Gateway, PDN gateway, servers, mobility management entities, network nodes, and/or network equipment devices. Various embodiments are also directed to methods, e.g., method of controlling and/or operating CBSD devices, network nodes, SAS, nodes, servers, user equipment devices, controllers, mobility management entities or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements or steps are implemented using hardware circuitry.

In various embodiments devices, servers, nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., communications nodes such as CBSD, UEs, and SAS are configured to perform the steps of the methods described as being performed by the CBSD, UEs, SAS. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., CBSD, UE, SAS, with a processor which includes a component corresponding to each of the steps of the various described methods performed by the device in which the processor is included. In some but not all embodiments a device, e.g., CBSD, UE, SAS, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a CBSD, UE, SAS. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a CBSD, UE or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a Spectrum Access System (SAS), the method comprising:
    receiving, from a first Citizens Broadband Radio Service Device (CBSD), first user equipment (UE) information including at least one of timing advance or power headroom information for one or more UEs in communication with said first CBSD;
    estimating, based on the received first UE information, a first CBSD coverage area;
    making a first resource allocation to the first CBSD based on the estimated first CBSD coverage area, said first resource allocation being a transmission power allocation to the first CBSD; and
    prior to estimating the first CBSD coverage area, identifying the UE with the largest timing advance in communication with the first CBSD.

2. The method of claim 1, wherein estimating, based on the received first UE information, the first CBSD coverage area includes, when the identified UE with the largest timing advance in communication with the first CBSD also has the lowest power headroom of the UEs for which power headroom information is provided, using the power headroom of the identified UE with the largest timing advance to estimate the first CBSD coverage area.

3. The method of claim 2, wherein estimating, based on the received first UE information, the first CBSD coverage area further includes, when the identified UE with the largest timing advance also has the lowest power headroom of the UEs for which power headroom information is provided, taking into consideration the largest timing advance in addition to, the lowest power headroom information when determining the first CBSD coverage area.

4. The method of claim 1, further comprising:
wherein said first UE information including at least one of timing advance or power headroom information for one or more UEs in communication with said first CBSD includes information corresponding to multiple UEs;
when the identified UE in communication with the first CBSD having the largest timing advance does not also have the lowest power headroom of the UEs for which power headroom information is provided in said first UE information, processing the first UE information received from the first CBSD corresponding to multiple UEs to determine at least one of a timing advance or power headroom value to be used in determining the coverage area of the first CBSD.

5. The method of claim 4, wherein processing the first UE information received from the first CBSD corresponding to multiple UEs to determine at least one of a timing advance or power headroom value to be used in determining the coverage area of the first CBSD includes performing at least one of determining an average timing advance for UEs using the first CBSD or determining an average power headroom for UEs in communication with the first CBSD.

6. The method of claim 5, wherein timing advances (TAs) of UEs in communication with the first CBSD having a timing advance (TA) within a determined range of the average timing advance are used in determining the coverage area of the first CBSD.

7. The method of claim 6, wherein power headroom values of UEs in communication with the first CBSD that have a power headroom within a determined range of the average power headroom, and which also have a TA within the determined range of the average TA, are used in determining the coverage area of the first CBSD.

8. The method of claim 1, further comprising:
receiving, from a second CBSD, second user equipment (UE) information including at least one of timing advance or power headroom information for one or more UEs in communication with said second CBSD;
estimating, based on the received second UE information, a second CBSD coverage area; and
making a second resource allocation to the second CBSD based on the estimated first CBSD coverage area and the estimated second CBSD coverage area, said second resource allocation including an allocation of at least one of a frequency bandwidth allocation or transmission power allocation to the second CBSD.

9. The method of claim 1, further comprising:
receiving, from a second CBSD, second user equipment (UE) information including at least one of timing advance or power headroom information for one or more UEs in communication with said second CBSD;
estimating, based on the received second UE information, a second CBSD coverage area; and
making a second resource allocation to the first CBSD based on the estimated first CBSD coverage area and the estimated second CBSD coverage area, said second resource allocation including an allocation of at least one of a frequency bandwidth allocation or transmission power allocation to the first CBSD.

10. The method of claim 1, further comprising:
communicating the first resource allocation to the first CBSD.

11. A Spectrum Access System (SAS) comprising:
memory;
an input/output interface including at least one receiver and at least one transmitter;
one or more processors that control the SAS to:
receive, from a first Citizens Broadband Radio Service Device (CBSD), first user equipment (UE) information including at least one of timing advance or power headroom information for one or more UEs in communication with said first CBSD;
estimate, based on the received first UE information, a first CBSD coverage area;
make a first resource allocation to the first CBSD based on the estimated first CBSD coverage area, said first resource allocation being a transmission power allocation to the first CBSD; and
prior to estimating the first CBSD coverage area, identify the UE with the largest timing advance in communication with the first CBSD.

12. The Spectrum Access System of claim 11, wherein said to estimate, based on the received first UE information, the first CBSD coverage area includes, when the identified UE having the largest timing advance also has the lowest power headroom of the UEs for which power headroom information is provided, using the power headroom information of the identified UE with the largest timing advance to estimate the first CBSD coverage area.

13. The Spectrum Access System of claim 12, wherein said to estimate, based on the received first UE information, the first CBSD coverage area includes, when the identified UE having the largest timing advance also has the lowest power headroom of the UEs for which power headroom information is provided, taking into consideration the largest timing advance, in addition to, the lowest power headroom information, when determining the first CBSD coverage area.

14. The Spectrum Access System of claim 11,
wherein said first UE information including at least one of timing advance or power headroom information for one or more UEs in communication with said first CBSD includes information corresponding to multiple UEs;
wherein said one or more processors control the SAS to process the UE information received from the first CBSD corresponding to multiple UEs to determine at least one of a timing advance or power headroom value to be used in determining the coverage area of the first CBSD in response to determining the UE in communications with the first CBSD having the largest timing advance does not also have the lowest power headroom.

15. The Spectrum Access System of claim 14, wherein said processing the first UE information received from the first CBSD corresponding to multiple UEs to determine at least one of a timing advance or power headroom value to be used in determining the coverage area of the first CBSD includes performing at least one of determining an average timing advance for UEs in communication with the first CBSD or determining an average power headroom for UEs in communication with the first CBSD.

16. The Spectrum Access System of claim 15, wherein timing advances of UEs in communication with the first CBSD having a timing advance (TA) within a determined range of the average timing advance are used in determining the coverage area of the first CBSD.

17. The Spectrum Access System of claim 16, wherein power headroom values of UEs in communication with the first CBSD that have a power headroom within a determined range of the average power headroom, and which also have a timing advance within the determined range of the average timing advance, are used in determining the coverage area of the first CBSD.

18. The Spectrum Access System of claim 11, wherein said one or more processors controls the SAS to:
receive, from a second CBSD, second user equipment (UE) information including at least one of timing advance or power headroom information for one or more UEs in communication with said second CBSD;
estimate, based on the received second UE information, a second CBSD coverage area; and
make a second resource allocation to the second CBSD based on the estimated first CBSD coverage area and the estimated second CBSD coverage area, said second resource allocation including an allocation of at least one of a frequency bandwidth allocation or transmission power allocation to the second CBSD.

19. The Spectrum Access System of claim 11, wherein said one or more processors controls the SAS to:
receive, from a second CBSD, second user equipment (UE) information including at least one of timing advance or power headroom information for one or more UEs in communication with said second CBSD;
estimate, based on the received second UE information, a second CBSD coverage area; and
make a second resource allocation to the first CBSD based on the estimated first CBSD coverage area and the estimated second CBSD coverage area, said second resource allocation including an allocation of at least one of a frequency bandwidth allocation or transmission power allocation to the first CBSD.

20. A non-transitory computer readable medium including a first set of computer executable instructions which when executed by a processor of a Spectrum Access System (SAS) device cause the SAS device to perform the steps of:
receiving, from a first Citizens Broadband Radio Service Device (CBSD), first user equipment (UE) information including at least one of timing advance or power headroom information for one or more UEs in communication with said first CBSD;
estimating, based on the received first UE information, a first CBSD coverage area;
making a first resource allocation to the first CBSD based on the estimated first CBSD coverage area, said first resource allocation being a transmission power allocation to the first CBSD; and
wherein said estimating, based on the received first UE information, the first CBSD coverage area includes, when the first CBSD having the largest timing advance also has the lowest power headroom of the UEs for which power headroom information is provided, using the power headroom of the UE with the largest timing advance to estimate the first CBSD coverage area.

* * * * *